(12) United States Patent
Hane et al.

(10) Patent No.: US 8,330,943 B2
(45) Date of Patent: Dec. 11, 2012

(54) SIGNAL PROCESSING APPARATUS USED FOR OPTICAL SIGNAL OUTPUT DEVICE AND OPTICAL DISPLACEMENT DETECTION SYSTEM

(75) Inventors: Jun Hane, Tokyo (JP); Hiromasa Fujita, Hachioji (JP); Eiji Yamamoto, Musashimurayama (JP)

(73) Assignee: Olympus Corporation, Tokyo (JP)

( * ) Notice: Subject to any disclaimer, the term of this patent is extended or adjusted under 35 U.S.C. 154(b) by 174 days.

(21) Appl. No.: 12/976,349

(22) Filed: Dec. 22, 2010

(65) Prior Publication Data

US 2011/0157578 A1 Jun. 30, 2011

(30) Foreign Application Priority Data

Dec. 25, 2009 (JP) ................................. 2009-295977

(51) Int. Cl.
*G01C 3/08* (2006.01)
(52) U.S. Cl. ......... 356/5.1; 356/3.01; 356/4.1; 356/5.01
(58) Field of Classification Search ........ 356/3.01–3.15, 356/4.01–4.1, 5.01–5.15, 6–22, 28, 28.5, 356/139.01–139.1
See application file for complete search history.

(56) References Cited

U.S. PATENT DOCUMENTS 7,499,150 B2 * 3/2009 Lewis et al. ................... 356/5.01

FOREIGN PATENT DOCUMENTS

JP 48-78959 * 10/1973

* cited by examiner

*Primary Examiner* — Luke Ratcliffe
(74) *Attorney, Agent, or Firm* — Scully Scott Murphy & Presser, PC

(57) ABSTRACT

A signal processing apparatus includes a phase shift unit and a signal processing unit. The phase shift unit shifts phases of at least one set of first periodic signals and second periodic signals. The first periodic signals are output from an optical signal output device connected to a displacement detection target and have amplitude gradually increasing with a displacement in a predetermined direction of the displacement detection target. The second periodic signals are output from the optical signal output device connected to the displacement detection target and have amplitude gradually decreasing with the displacement in the predetermined direction of the displacement detection target. The signal processing unit executes a predetermined operation with respect to the first and second periodic signals output from the phase shift unit to obtain a displacement of the displacement detection target.

11 Claims, 16 Drawing Sheets

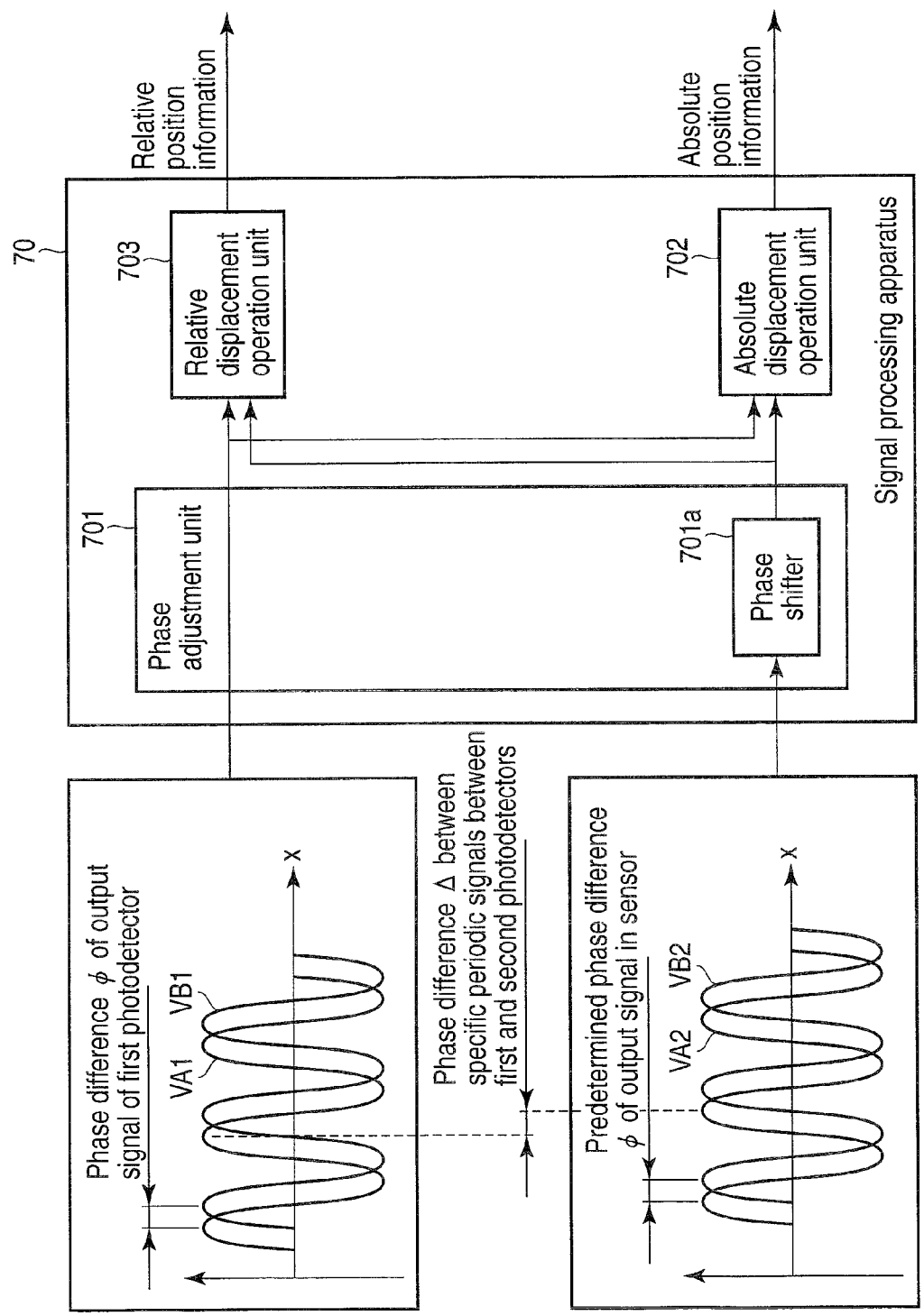
F I G. 5

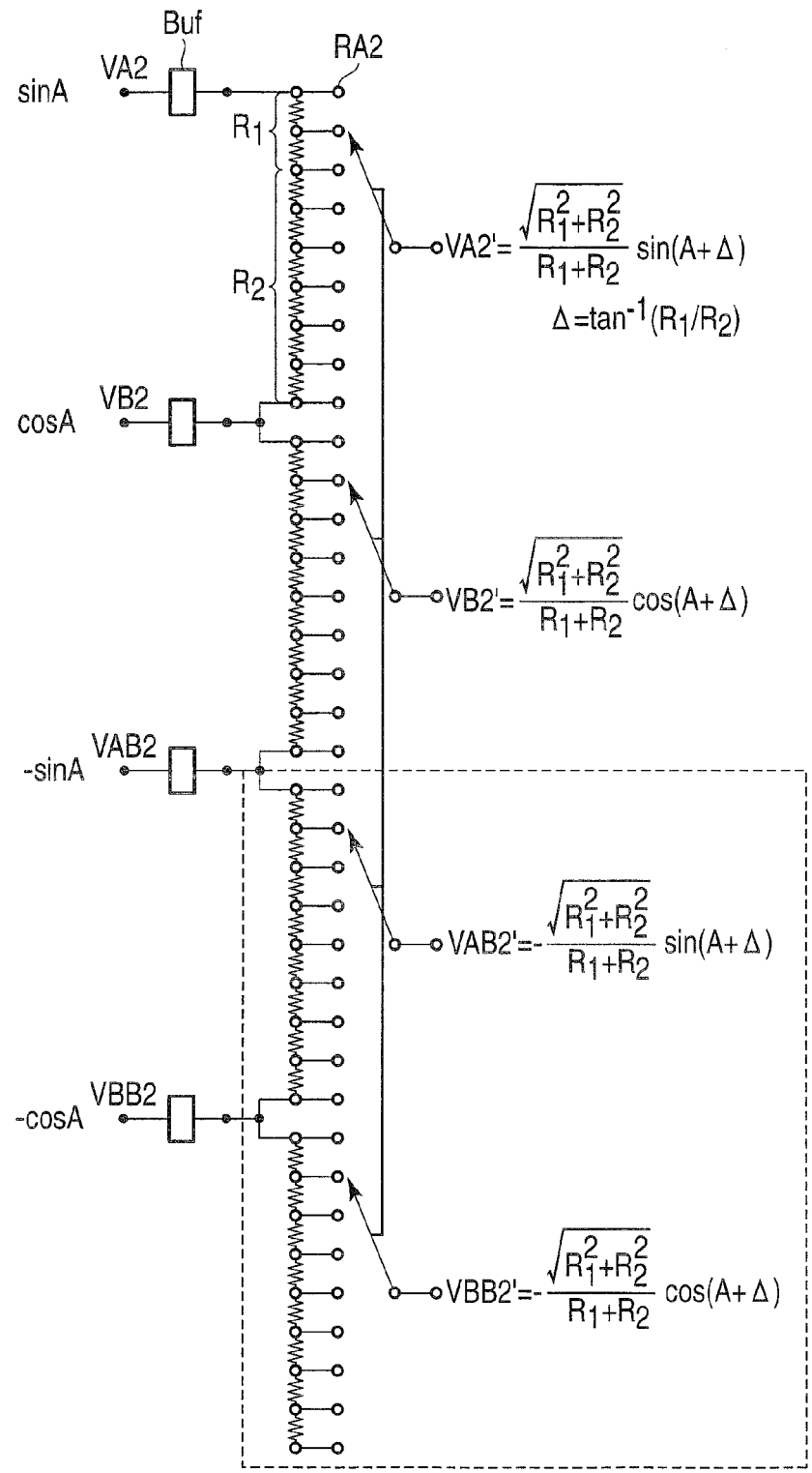
F I G. 7

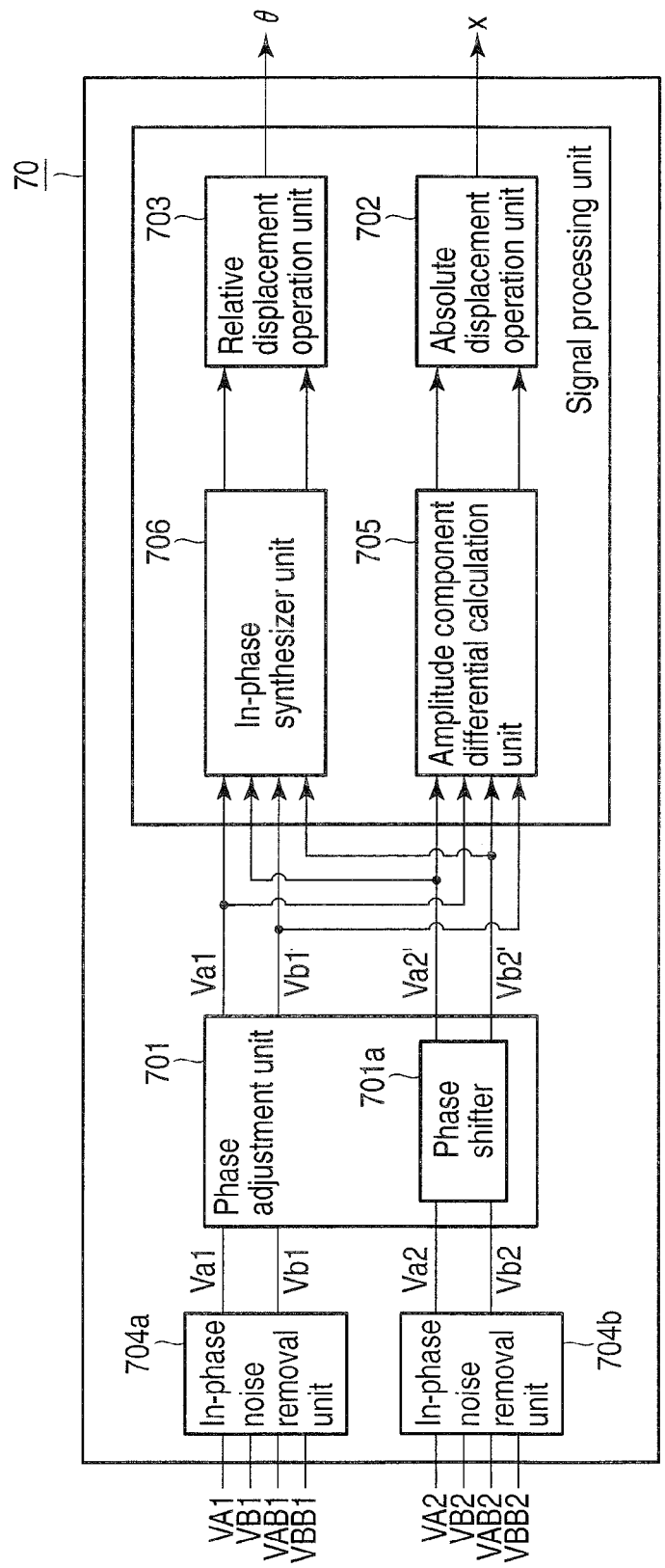
F I G. 8

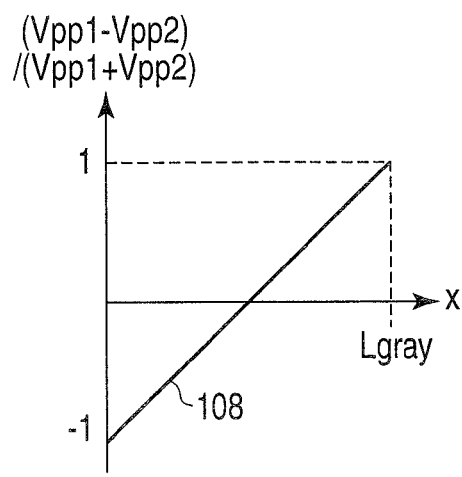
F I G. 12
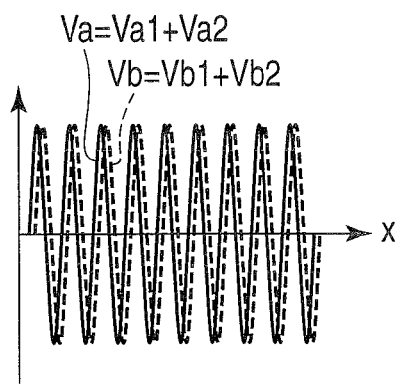
F I G. 13

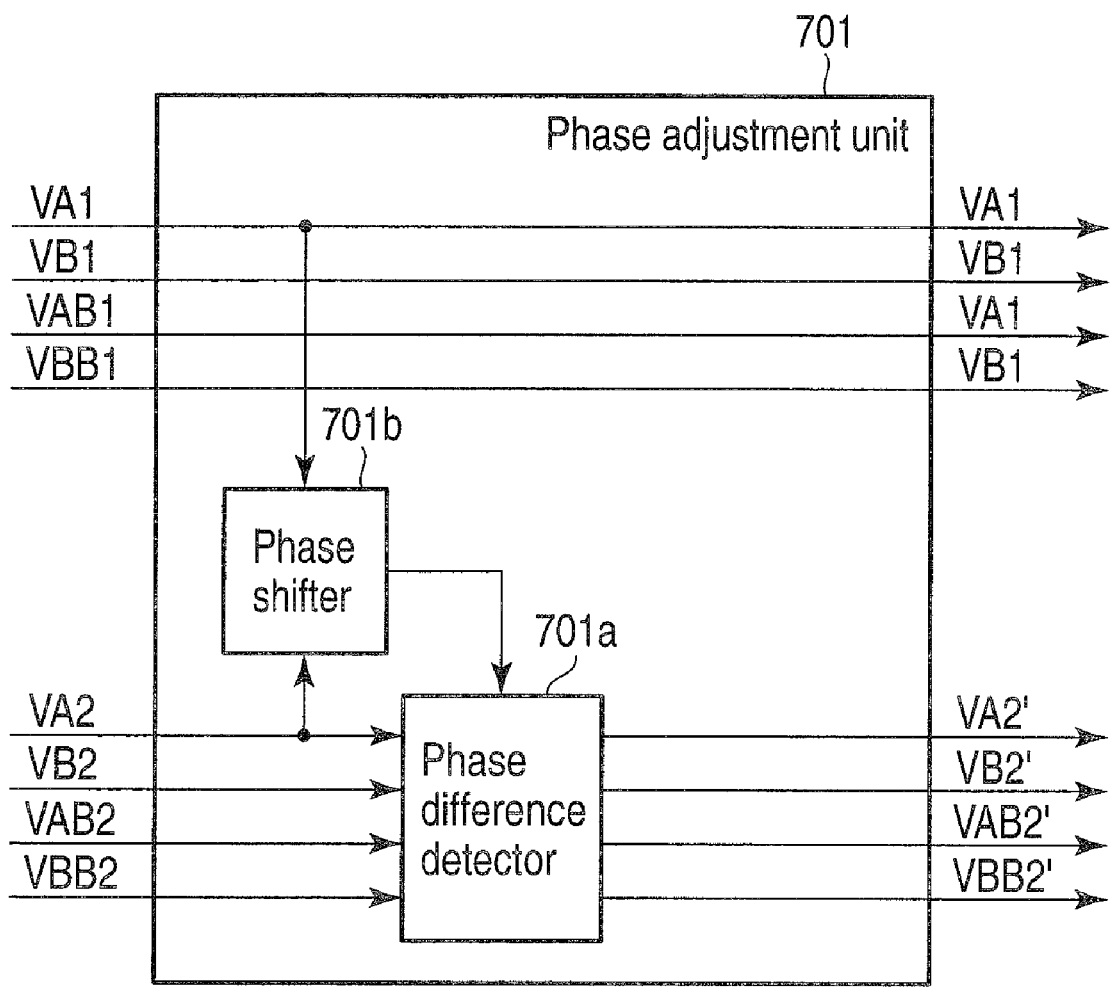
F I G. 17

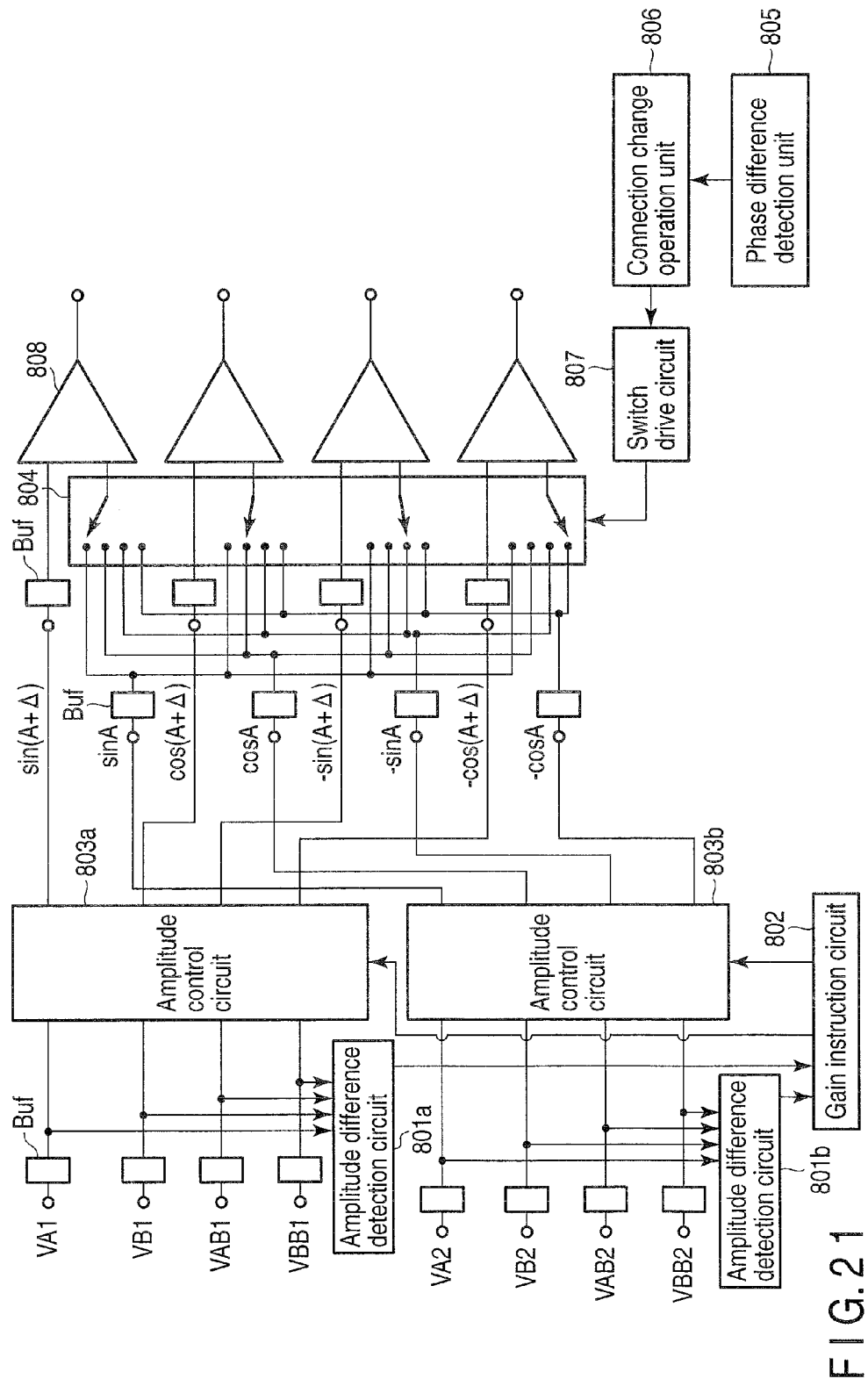
F I G. 21

SIGNAL PROCESSING APPARATUS USED FOR OPTICAL SIGNAL OUTPUT DEVICE AND OPTICAL DISPLACEMENT DETECTION SYSTEM

CROSS-REFERENCE TO RELATED APPLICATIONS

This application is based upon and claims the benefit of priority from prior Japanese Patent Application No. 2009-295977, filed Dec. 25, 2009, the entire contents of which are incorporated herein by reference.

BACKGROUND OF THE INVENTION

1. Field of the Invention

The present invention relates to a signal processing apparatus which processes a signal from an optical signal output device for detecting a displacement of a displacement detection target. Further, the present invention relates to an optical displacement detection system which includes the signal processing apparatus and detects a displacement of a displacement detection target.

2. Description of the Related Art

The following technique is disclosed in, for example, Jpn. Pat. Appln. KOKAI Publication No. 48-78959 as a technique related to an optical displacement detection system, which detects a displacement of a displacement detection target. Specifically, the foregoing Publication No. 48-78959 discloses a photoelectric detector. The photoelectric detector has a structure in which a slit or reflection plane is provided in line with a predetermined space with respect to a detection object, and detects an optical pulse resulting in the slit or reflection plane. Moreover, the photoelectric detector is configured so that the radial length of the slit or reflection plane becomes gradually large clockwise.

FIG. 22 is a side view showing a member related to an optical signal output device of the photoelectric detector (i.e., optical displacement detection system) disclosed in the foregoing Publication No. 48-78959. As seen from FIG. 22, a light beam B emitted from a light source 1 is irradiated on a slit of a detection object which is a scale 4, and then, the transmitted light is detected by a photodetector 2.

FIG. 23 is a top plan view showing the scale 4 in the photoelectric detector disclosed in the foregoing Publication No. 48-78959. As shown in FIG. 23, the radial length of the slit formed on the scale is increased or decreased with a predetermined space based on a reference position A or B as a reference with respect to the rotational direction shown by the arrow of FIG. 23 (FIG. 23 shows an example of increasing the radial length).

FIG. 24 is a graph showing an output signal of a photodetector in the photoelectric detector disclosed in the foregoing Publication No. 48-78959. In the graph shown in FIG. 24, the horizontal axis takes a displacement (rotational angle) of a detection object, and the vertical axis takes an output of the photodetector 2. When the scale 4 is rotated in the counterclockwise direction, the aperture length of the slit is decreased. In this case, as seen from FIG. 24, the following characteristic appears; specifically, the amplitude of the output signal from the photodetector gradually decreases. The output signal having the foregoing characteristic is suitably operated using a signal processing apparatus, and thereby, it is possible to detect a rotational speed of a detection object. Moreover, a change of the amplitude is detected, and thereby, it is possible to detect a rotating direction of the scale 4.

The foregoing Publication No. 48-78959 does not have the following description. Specifically, according to the foregoing structure, the magnitude of an amplitude component of an output signal with respect to a rotating displacement is previously checked. Then, the amplitude component of the output signal is measured, and thereby, it is possible to detect an absolute position from a reference position of a rotational angle of the scale 4. In this way, the photoelectric detector disclosed in the Publication No. 48-78959 is capable of detecting a kinematic direction and an absolute position of a detection object based on the amplitude of a detection signal, which changes with the movement of a detection object.

In order to improve a detection sensitivity of an absolute position or to widen a detection range of the absolute position, the aperture length of the slit is set smaller. In this case, the smaller the minimum value of the aperture length of the slit is set, the more the amplitude of the output signal is reduced. Therefore, a noise component becomes relatively large in the output signal from the photodetector 2. As a result, the detection performance (resolving power, stability) is reduced at a portion where the aperture length of the slit is small.

Moreover, if the absolute position is detected using the configuration disclosed in the Publication No. 48-78959, there is a need to previously check an amplitude characteristic of an output signal from the photodetector 2 with respect to a rotating displacement. In this case, the amplitude characteristic of an output signal with respect to a rotating displacement changes resulting from environment, attaching shakiness of a sensor, an age-based change and defect on a scale, for example. For this reason, the detection accuracy and reliability are extremely low.

BRIEF SUMMARY OF THE INVENTION

An object of the present invention is to provide a signal processing apparatus used for an optical signal output device, which can keep a resolving power and stability of a positional detection at a high level, and can realize improvement of a detection sensitivity of an absolute position and enlargement of a detection range with a simple structure. Another object of the present invention is to provide an optical displacement detection system including the foregoing signal processing apparatus.

According to a first aspect of the invention, there is provided a signal processing apparatus used for an optical signal output device, comprising: a phase shift unit configured to shift phases of at least one set of first periodic signals, which are output from an optical signal output device connected to a displacement detection target and which have amplitude gradually increasing with a displacement in a predetermined direction of the displacement detection target, and second periodic signals, which are output from the optical signal output device connected to the displacement detection target and which have amplitude gradually decreasing with the displacement in the predetermined direction of the displacement detection target; and a signal processing unit configured to execute a predetermined operation with respect to the first and second periodic signals output from the phase shift unit to obtain a displacement of the displacement detection target.

According to a second aspect of the invention, there is provided an optical displacement detection system comprising: an optical signal output device comprising; a scale, which is formed with first and second track patterns so that a displacement direction of the displacement detection target is set as a longitudinal direction; a light source configured to irradiate a light beam to the scale; and a sensor head, which includes a first photodetector detecting the light beam emitted from the light source via the first track pattern to generate first periodic signals whose amplitude gradually increase with a displacement of a predetermined direction of the displacement detection target, and a second photodetector detecting the light beam emitted from the light source via the second track pattern to generate second periodic signals whose amplitude gradually decrease with the displacement of the predetermined direction of the displacement detection target, the first and second track patterns, the first and second photodetectors and the light source being arranged so that detection by the first photodetector is associated with the light source and the first track pattern, and that detection by the second photodetector is associated with the light source and the second track pattern, a signal processing apparatus comprising: a phase shift unit configured to shift phases of at least one set of the first and second periodic signals; and a signal processing unit configured to execute a predetermined operation with respect to the first and second periodic signals output from the phase shift unit to obtain a displacement of the displacement detection target.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 5 is a view to explain the conceptual configuration of a signal processing apparatus according to an embodiment of the present invention;

FIG. 7 is a view showing the circuit configuration of a modification example of the phase shift unit;

FIG. 8 is a block diagram showing a first configuration of a signal processing apparatus;

FIG. 12 is a graph showing the characteristic of the ratio of (Vpp1+Vpp2) and (Vpp1−Vpp2);

FIG. 13 is a view showing an example of the output characteristic of an in-phase synthesizer unit;

FIG. 17 is a block diagram showing the configuration of a first modification example of a phase adjustment unit;

FIG. 21 is a block diagram showing the configuration of a modification example for executing a signal addition without phase adjustment;

DETAILED DESCRIPTION OF THE INVENTION

Various embodiments of the present invention will be hereinafter described with reference to the accompanying drawings.

Figure 1:
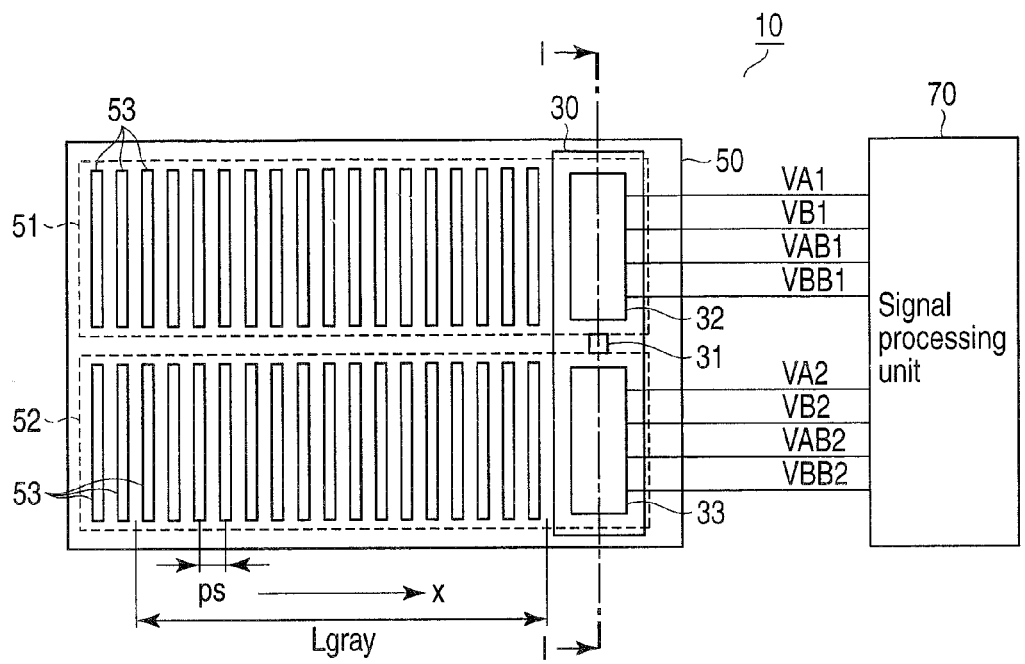
FIG. 1 is a top plan view showing the configuration of an optical displacement detection system according to an embodiment of the present invention.
Figure 2:
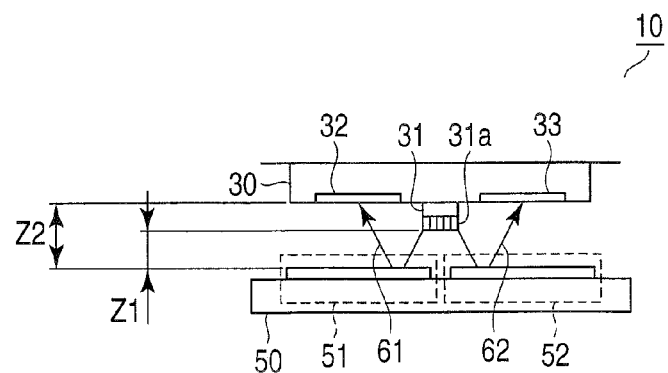
FIG. 2 is a cross-sectional view taken along the line I-I showing the optical displacement detection system shown in FIG. 1.

FIG. 1 is a top plan view showing the configuration of an optical displacement detection system according to an embodiment of the present invention. FIG. 2 is a cross-sectional view taken along the line I-I showing the optical displacement detection system shown in FIG. 1.

Terms related to a track pattern formed in a scale described later will be defined before the explanation of an optical displacement detection system according to an embodiment of the present invention. An optical pattern such that any of effective reflectance, effective transmittance and diffraction efficiency gradually increases or decreases in a predetermined section along the displacement direction of a displacement detection target is defined as a "grayscale pattern". An optical pattern such that any of effective reflectance, effective transmittance and diffraction efficiency periodically changes with respect to the displacement direction of a displacement detection target is defined as an "encode pattern". A pattern having optical characteristics combining an encode pattern with a grayscale pattern is defined as a "modulation code pattern". A track formed of any of a grayscale pattern and a modulation code pattern is defined as a "gray track".

Hereinafter, the configuration of an optical displacement detection system will be described with reference to FIGS. 1 and 2. As shown in FIG. 1, an optical displacement detection system 10 comprises an optical signal output device including a sensor head 30 and a scale 50, and a signal processing apparatus 70. One of the foregoing sensor head 30 and scale 50 is connected to a displacement detection target displaceable to a predetermined direction, and the other thereof is connected to a reference surface. According to this embodiment, the displacement direction of a displacement detection target is set as the direction (X-direction) along the x-axis shown in FIG. 1.

The structure of an optical signal output device will be described below. As shown in FIG. 1, a sensor head 30 of the optical signal output device includes a light source 31, first and second photodetectors 32 and 33. As can be seen from FIG. 2, a light-receiving surface (provided with first and second photodetectors 32 and 33) of the sensor head 30 and the scale 50 are arranged in parallel to face each other.

The light source 31 includes a light source (e.g., laser diode) and slits 31a. The light source 31 irradiates light beams from the light source to the scale 50 through the slits 31a. According to this embodiment, the light source 31 is configured to irradiate light beams in two directions through the slits 31a as can be seen from FIG. 2. In FIG. 2, a reference number 61 denotes one light beam while a reference number 62 denotes the other light beam.

The first photodetector 32 has a light-receiving surface, which is formed with four-group light-receiving element arrays. Each of light-receiving element arrays has a plurality of light-receiving elements (e.g., photodiode) for converting the light beam 61 emitted to the scale 50 and reflected by the scale 50 into an electric signal. The second photodetector 33 has a light-receiving surface, which is formed with four-group light-receiving element arrays. Each of light-receiving element arrays has a plurality of light-receiving elements (e.g., photodiode) for converting the light beam 62 emitted to the scale 50 and reflected by the scale 50 into an electric signal. In this case, the light-receiving element forming each group light-receiving element array is formed having the same spatial period as a spatial period of an optical image (diffraction pattern) formed by each of the first and second photodetectors by a reflected light from the scale 50.

Figure 3:
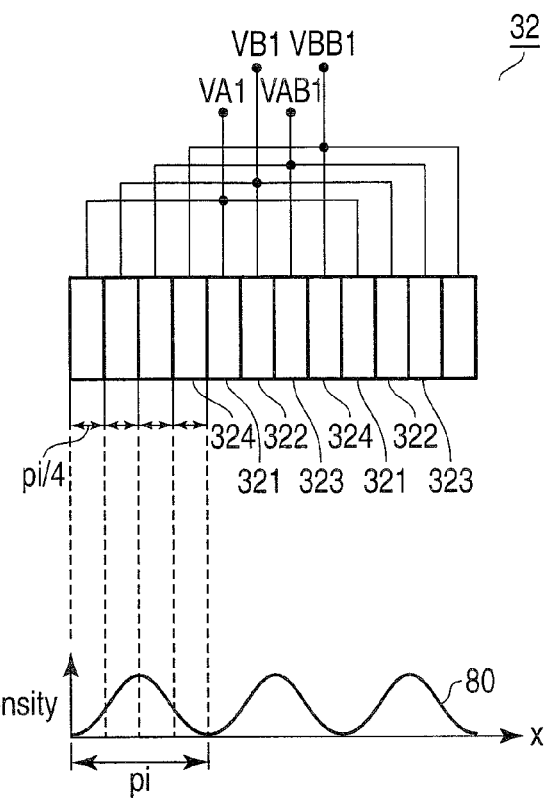
FIG. 3 is a view showing an example of the relationship between a light-receiving surface formed on a first photodetector and an optical image formed on the light-receiving surface.

FIG. 3 is a view showing an example of the relationship between a light-receiving surface formed on a first photodetector 32 and an optical image formed on the light-receiving surface. In a second photodetector 33, the same relationship as the first photodetector 32 described below is established.

Although the details will be described later, the light beam 61 emitted from the light source 31 is reflected by the scale 50. Then, the reflected light is incident on a light-receiving surface of the first photodetector 32. For example, an optical image 80 having a spatial period pi shown in FIG. 3 is formed on the light-receiving surface of the first photodetector 32. As described above, the first photodetector 32 is formed with four-group light-receiving element arrays 321 to 324 at a pitch equivalent to a spatial period pi of the optical image 80. These light-receiving element arrays 321 to 324 are arranged in a state of being shifted by pi/4 in the spatially periodic direction. In the light-receiving array 321, each light-receiving element outputs a signal from an output terminal VA1. In the light-receiving array 322, each light-receiving element outputs a signal from an output terminal VB1. In the light-receiving array 323, each light-receiving element outputs a signal from an output terminal VAB1. In the light-receiving array 324, each light-receiving element outputs a signal from an output terminal VBB1.

According to the foregoing configuration, light-receiving element arrays 321 to 324 each detect a light having a spatial phase difference, which is shifted by a ¼ period. Therefore, output signals VA1, VB1, VAB1 and VBB1 of each light-receiving element array of the first photodetector 32 are provided a periodic signal which is shifted by an electric angle of 90° (i.e., ¼ period).

The scale 50 is formed so that the displacement direction (X-direction in FIG. 1) of a displacement target is set as a longitudinal direction. A surface facing the sensor head 30 of the scale 50 is formed with a gray track 51 given as a first track pattern and a gray track 52 given as a second track pattern.

Gray tracks 51 and 52 shown in FIG. 1 are formed of a modulation code pattern only, for example. The modulation code pattern of the gray track 51 is formed with a plurality of encode patterns 53, which have different effective reflectance so that an effective reflectance gradually increases every spatial period ps, along the X-direction of FIG. 1. Moreover, the modulation code pattern of the gray track 52 is formed with a plurality of encode patterns 53, which have different effective reflectance so that an effective reflectance gradually decreases every spatial period ps, along the X-direction of FIG. 1. In this way, the foregoing gray tracks 51 and 52 are formed, and thereby, the modulation code patterns forming gray tracks 51 and 52 have an optical characteristic such that an effective reflectance is mirror-inverted.

The operation of an optical signal output device will be described below. According to this embodiment, various formation principles are applicable to the formation principle of an optical image formed on each light-receiving surface of first and second photodetectors 32 and 33. Herein, the detection principle using a triple lattice configuration is given as a typical example.

As shown in FIG. 2, a distance between the light source 31 and the encode pattern 53 on the scale 50 is set as Z1. On the other hand, a distance between the encode pattern 53 on the scale 50 and each light-receiving surface of first and second photodetectors 32 and 33 is set as Z2. Moreover, a pitch in the X-direction of the slits 31a formed in the light source 31 is set as po.

When light beams 61 and 62 are irradiated to an encode pattern on the scale 50 through the slits 31a having a pitch po formed in the light source 31, these light beams 61 and 62 are reflected by the encode pattern 53. In this way, a periodic optical image having a spatial period pi is formed on each light-receiving surface of first and second photodetectors 32 and 33. In this case, the foregoing pi, po, ps, Z1 and Z2 satisfy the following relationship (equations 1 and 2).

$$pi = ps \cdot (Z1+Z2)/Z1 \qquad (1)$$

$$po = ps \cdot (Z1+Z2)/Z2 \qquad (2)$$

In order to clearly form a periodic optical image having a spatial period pi on each light-receiving surface of first and second detectors 32 and 33, the following condition is required. Namely, the foregoing pi, ps, po, Z1, Z2 and a light wavelength λ of the light source 31 have need to coincide with the condition for forming an optical image using a triple lattice configuration. However, according to this embodiment, the formation principle of an optical image is not limited to the imaging principle of an optical image using the foregoing triple lattice configuration, but other imaging principle may be used. Therefore, the detailed explanation about the process of determining the foregoing pi, ps, po, Z1, Z2 and a light wavelength λ of the light source 31 is omitted herein.

As described above, the foregoing first and second photodetectors 32 and 33 are formed with four-group light-receiving element arrays with a pitch equivalent to a spatial period pi of an optical pattern. Each group is arranged in a state of being shifted by pi/4 along the spatial period direction. Thus, light-receiving element arrays of each group detect light having a spatial phase difference shifted by ¼ period with respect to an optical image on the light-receiving surface with a spatial period pi. Therefore, output signals (first periodic signals) VA1, VB1, VAB1 and VBB1 of each light-receiving element array of the first photodetector 32 are each provided as a periodic signal, which is shifted by an electric angle of 90°. Likewise, output signals (second periodic signals) VA2, VB2, VAB2 and VBB2 of each light-receiving element array of the second photodetector 33 are each provided as a periodic signal, which is shifted by an electric angle of 90°.

As described above, the modulation code pattern forming the gray track 51 is formed with the encode pattern 53 to have an optical characteristic such that an effective reflectance gradually increases along the displacement direction of a displacement detection target. Moreover, the modulation code pattern forming the gray track 52 is formed with the encode pattern 53 to have an optical characteristic such that an effective reflectance gradually decreases along the displacement direction of a displacement detection target. Thus, when a displacement detection target displaces by ps in the X-direction, each of light beams 61 and 62 from the light source 31 is irradiated to the encode pattern 53 of a position shifted by ps. Therefore, optical images based on reflected light from the encode patterns 53 of the position shifted by ps are formed on each light-receiving surface of first and second photodetectors 32 and 33. For this reason, output signals VA1, VB1, VAB1 and VBB1 of light-receiving element arrays of each group of the first photodetector 32 each increase in its amplitude. Conversely, output signals VA2, VB2, VAB2 and VBB2 of light-receiving element arrays of each group of the second photodetector 33 each decrease in its amplitude.

Namely, every when a displacement detection target displaces by ps in the X-direction, periodic signals VA1, VB1, VAB1 and VBB1 having a phase difference shifted by 90° (i.e., ¼ period) and a characteristic such that amplitude gradually increases are output from output terminals VA1, VB1, VAB1 and VBB1 of light-receiving element arrays of each group of the first photodetector 32. Moreover, periodic signals VA2, VB2, VAB2 and VBB2 having a phase difference shifted by 90° (i.e., ¼ period) and a characteristic such that amplitude gradually decreases are output from output terminals VA2, VB2, VAB2 and VBB2 of light-receiving element arrays of each group of the second photodetector 33.

Figure 4A:
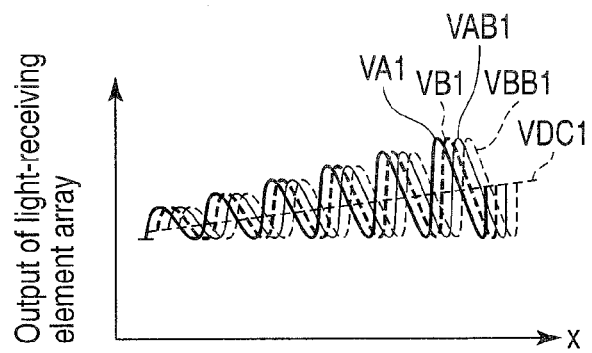
FIGS. 4A and 4B are views showing an example of an output signal of four-group light-receiving element arrays of a photodetector.
Figure 4B:
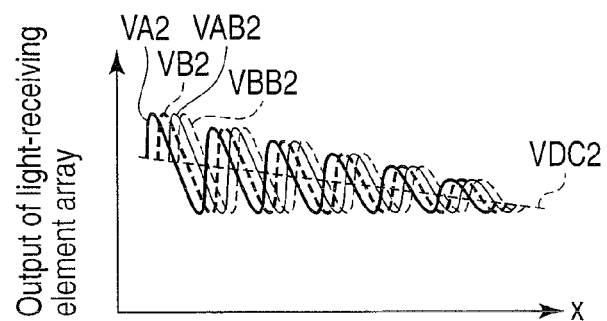

FIG. 4A shows an example of output signals of four-group light-receiving element arrays of the first photodetector 32. FIG. 4B shows an example of output signals of four-group light-receiving element arrays of the second photodetector 33. As shown in FIGS. 4A and 4B, the actual output signal of a light-receiving element array contains a direct current (DC) component, which is considerably affected by an optical arrangement of the light source 31 and the scale 50. In FIG. 4A, each DC component of output signals VA1, VB1, VAB1 and VBB1 is shown as VDC1. In FIG. 4B, each DC component of output signals VA2, VB2, VAB2 and VBB2 is shown as VDC2. As can be seen from FIG. 4A, VDC1 has a characteristic such that the output level gradually increases (simply increases) according to the displacement of a displacement detection target. Moreover, VDC2 has a characteristic such that the output level gradually decreases (simply decreases) according to the displacement of a displacement detection target.

The configuration and operation of the optical signal output device are as described above. In this case, the configuration of gray tracks 51 and 52 is not limited to that shown in FIG. 1. For example, the configuration of gray tracks 51 and 52 is applied to a reflection-type optical signal output device. This device detects reflected light from the scale 50 of light beams 61 and 62 emitted from the light source 31 by means of first and second photodetectors 32 and 33. In contrast to the foregoing device, the foregoing configuration of gray tracks 51 and 52 is applied to a transmission-type optical signal output device. This device detects transmitted light of light beams 61 and 62 emitted to the scale 50 from the light source by means of first and second photodetectors 32 and 33. In this case, each modulation code pattern of gray track 51 and 52 has an optical characteristic such that an effective transmittance is mirror-inverted. This embodiment is applicable to various gray tracks in which spatial amplitude or the total quantity of light of an optical image formed on a light-receiving surface of first or second photodetector 32 or 33 by reflected light, transmitted light or diffracted light of light beams 61 and 62 irradiated to the scale 50 is modulated.

The foregoing example shows the configuration in which the light source 31 is provided with the slits 31a having a pitch po. This configuration takes the use of the imaging principle of an optical image using the triple lattice configuration into consideration. Therefore, other imaging principles are used; the slits 31a are not necessarily an essential constituent component.

A signal processing apparatus 70 will be described below. First, the concept of a signal processing by the signal processing apparatus 70 will be described below. FIG. 5 is a view showing the conceptual configuration of a signal processing apparatus according to this embodiment.

As can be seen from FIG. 5, output signals VA1 and VB1 having mutually different phase $\phi$ (90° in FIG. 5) (i.e., ¼ period)) are input to the signal processing apparatus 70 as an output signal from the first photodetector 32. Moreover, output signals VA2 and VB2 having mutually different phase $\phi$ (90° in FIG. 5) (i.e., ¼ period)) are input to the signal processing apparatus 70 as an output signal from the second photodetector 33. This is because of simplifying the explanation. Output signals VA1, VB1, VA2 and VB2 shown in FIG. 5 are signals sufficiently necessary to detect the displacement of a displacement detection target. In addition to the foregoing these signals, output signals VAB1, VBB1, VAB2 and VBB2 are input to the signal processing apparatus 70 to remove an in-phase noise.

Moreover, as described in FIG. 4A, output signals VA1 and VB1 have a characteristic such that amplitude and DC component gradually increase according to a displacement. As described in FIG. 4B, output signals VA2 and VB2 have a characteristic such that amplitude and DC component gradually decrease according to a displacement. For simplification of explanation, In FIG. 5, the amplitude and DC component of signals VA1, VB1, VA2 and VB2 are illustrated as being constant without depending on a displacement. The operation of a phase adjustment unit 701 with respect to output signals shown in FIGS. 4A and 4B is almost the same as the output signals shown in FIG. 5 described later.

As depicted in FIG. 5, the signal processing unit 70 mainly comprises a phase adjustment unit 701, an absolute displacement operation unit 702 and a relative displacement operation unit 703.

The phase adjustment unit 701 has one or more phase shifters. In this case, the phase shifter simultaneously shifts the phase of one group of periodic signals output from the same photodetector. According to this embodiment, the phase shifter shifts at least one phase of output signals VA1 and VB1 of the first photodetector 32 and output signals VA2 and VB2 of the second photodetector 33 by a phase difference Δ between output signals of the foregoing first and second photodetectors 32 and 33. The phase adjustment unit 701 shown in FIG. 5 has a phase shifter 701a which shifts the phase of output signals VA2 and VB2 of the second photodetector 33.

In the optical signal output device shown in FIG. 1, the scale 50 is formed with two-line gray tracks. As described above, the first and second photodetectors 32 and 33 are configured to independently receive reflected light of a light beam though each gray track. In this case, there is a high possibility that a phase shift Δ is generated between the following output signals due to a shift in the arrangement between the sensor head 30 and the scale 50. Specifically, the phase shift Δ is generated between the output signal VA1 of the first photodetector 32 and the output signal VA2 of the second photodetector 33 and between the output signal VB1 of the first photodetector 32 and the output signal VB2 of the second photodetector 33. According to the example of FIG. 1, the phase shift Δ is further generated between the output signal VAB1 of the first photodetector 32 and the output signal VAB2 of the second photodetector 33 and between the output signal VBB1 of the first photodetector 32 and the output signal VBB2 of the second photodetector 33.

A big load is given to a processing circuit for detecting an amplitude and phase of an analog periodic signal such as the foregoing output signal of the photodetector. So, an amplitude and phase of a signal obtained by adding and subtracting output signals of a plurality of photodetectors are detected. In this way, output signals of some photodetectors can be collected into one output signal. In this case, this serves to simplify the position detection thereafter.

When analog periodic signals having no phase difference are provided, even if addition and subtraction are carried out after the amplitude and phase of an analog periodic signal are detected and the amplitude and phase are detected after addition and subtraction of an analog periodic signal are carried out, the same result is obtained. However, if analog periodic signals having a phase lag are added and subtracted, a desired amplitude and phase is not obtained when the amplitude and phase thereafter are detected. Moreover, if the amplitude of an analog periodic signal before addition and subtraction variously changes for each photodetector, periodicity with respect to a displacement of a signal after addition and subtraction is lost. In this case, an error occurs in the detection result of the displacement.

It is difficult to mechanically obtain output signals with the same phase from the foregoing some photodetectors. If no mechanical phase adjustment is carried out or if it is desired not to obtain a phase lag, which is not removed by mechanical phase adjustment, electric phase adjustment is required. Thus, the phase shifter 701a of the phase adjustment unit 701 executes the foregoing electric phase adjustment.

For example, phase adjustment of the second photodetector 33 is performed by generating signals VA2' and VB2', which are shifted by Δ from the original phase. Specifically, the foregoing signals VA2' and VB2' are generated using output signals VA2 and VB2 mutually having a φ (90° in FIG. 5) phase difference and the following trigonometric function (equation 3).

$$a\cos A + b\sin A = \sqrt{a^2+b^2}\sin(A+\Delta)$$

$$\Delta = \tan^{-1}(a/b) \quad (3)$$

where, "a" and "b" are coefficients, and A corresponds to a displacement of a displacement detection target.

According to the condition for executing the calculation of the foregoing equation (3), the amplitude of output signals of the first photodetector 32 are equal, and also, the amplitude of output signals of the second photodetector 33 are equal. The amplitude of output signals of the first photodetector 32 and the amplitude of output signals of the second photodetector 33 are not necessarily equal.

In equation (3), a and b for satisfying $a^2+b^2=1$ and $\Delta=\tan^{-1}(a/b)$ are found. $\sin(A+\Delta)$ found in the foregoing manner is VA2'. Likewise, $\cos(A+\Delta)$ shifted by 90° in phase with respect to the foregoing $\sin(A+\Delta)$ is found. The foregoing $\cos(A+\Delta)$ is VB2'. In fact, the amplitude of VA2' and VB2' is not 1, but these signals VA2' and VB2' each have amplitude corresponding to amplitude of output signals VA and VB.

Figure 6A:
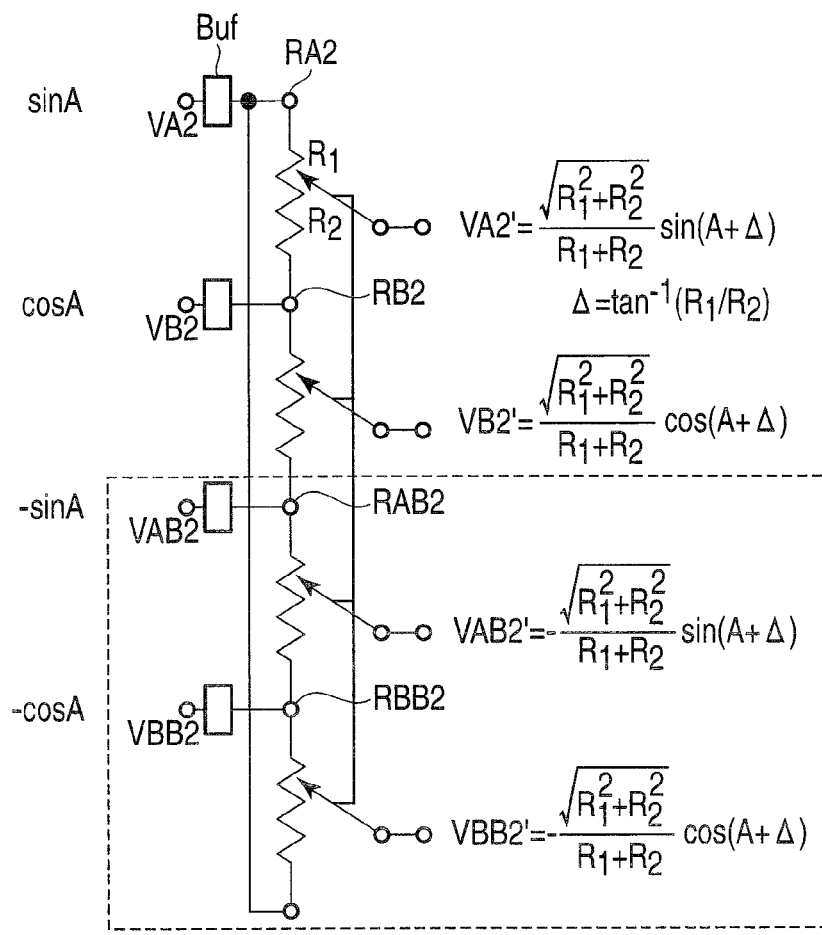
FIGS. 6A and 6B are views showing the circuit configuration of a phase shift unit.
Figure 6B:
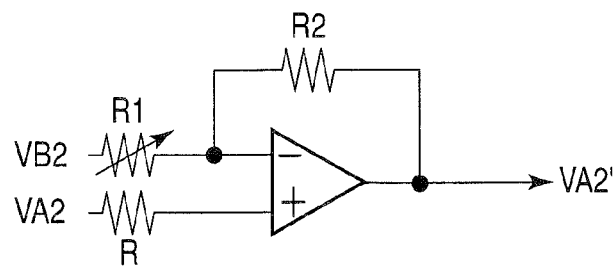

FIGS. 6A and 6B are the circuit configuration of the phase shifter for executing the foregoing phase adjustment shown in equation (3). FIG. 6A shows the circuit configuration for executing a phase adjustment with respect to a phase difference Δ of 0°≦Δ≦90°. This circuit has input terminals VA2, VB2, VAB2 and VBB2 for output signals from the second photodetector 33. Further, the circuit has variable resistors (four in FIG. 6A) corresponding to the number of input terminals. These variable resistors are connected in series. The input terminal VA2 is connected to a connection point RA2 of the variable resistors through a buffer circuit Buf such as a voltage follower. Likewise, the input terminal VB2 is connected to a connection point RB2 of the variable resistors through a buffer circuit Buf. Moreover, the input terminal VAB2 is connected to a connection point RAB2 of the variable resistors through a buffer circuit Buf. Likewise, the input terminal VBB2 is connected to a connection point RBB2 of the variable resistors through a buffer circuit Buf. These variable resistors are trimmer-operated together so that the resistance between terminals becomes equal.

In the circuit configuration shown in FIG. 6A, it is assumed that output signals VA2=sin A, VB2=cos A, VAB2=−sin A and VBB=−cos A, every succeeding two of which have 90° phase differences, are input. In this case, from output signals VA2 and VB2, an output signal VA2' having a phase difference of Δ with respect to the output signal VA2 is obtained from the following equation (4). Moreover, output signals VB2', VAB2' and VBB2' are obtained in the manner as above.

$$VA2' = \frac{\sqrt{R_1^2 + R_2^2}}{R_1 + R_2}\sin(A+\Delta) \quad (4)$$

$$\Delta = \tan^{-1}(R_1/R_2)$$

where, $R_1$ denotes a resistance between a connection point RA2 and a switch, and $R_2$ denotes a resistance between a switch and a connection point RB2.

In this case, $R_1/(R_1+R_2)$ corresponds to a of equation (3), and $R_2/(R_1+R_2)$ corresponds to b of equation (3).

The circuit of the phase shifter shown in FIG. 6A is combined several, and thereby, a phase adjustment range is widened. For example, two circuits are combined, and thereby, phase adjustment is possible in a range from 0 to 180°. Moreover, an input change circuit for changing the input to the phase shifter shown in FIG. 6A or an output change circuit for changing the output from the phase shifter is combined with the circuit of the phase shifter shown in FIG. 6A. In this way, phase adjustment is possible in all angle, that is, in a range from 0 to 360°.

As shown in FIG. 6A, a phase of output VAB2' shifts by 180° with respect to outputs VAB2', and a phase of output VBB2' shifts by 180° with respect to outputs VBB2'. Using the foregoing phase lag, a portion shown by the broken line is deleted from the circuit shown in FIG. 6A. Further, each phase of signals VA2' and VB2' may be inverted by 180° using an inverter so that signals VBB2' and VBB2' are generated.

According to the example shown in FIG. 6A, a phase shift is carried out by generating the sum signal through resistors; in this case, a circuit using an operational amplifier may be used. The detailed configuration of the circuit is shown in FIG. 6B. In the circuit of FIG. 6B, when signal VA2=sin A and signal VB2=cos A are input, the output VA2' is obtained from the following equation (5).

$$VA2' = \frac{\sqrt{(R_1+R_2)^2 + R_2^2}}{R_1 + 2 \cdot R_2} \sin(A + \Delta) \quad (5)$$

$$\Delta = -\tan^{-1}(R_2/(R_1+R_2))$$

In FIG. 6B, R1 denotes a variable resistor. According to the example of FIG. 6B, the resistance value of R1 is changed, and thereby, it is possible to change a phase shift amount in a range of $-90° \leq \Delta \leq 0°$. Further, if R2 is set as a variable resistor, it is possible to realize a phase shift of $\Delta=-90°$.

As can be seen from the foregoing description, according to the example shown in FIGS. 6A and 6B, a phase shift is possible in a range corresponding to 90° of an absolute value. The foregoing phase shift circuit is combined several, or input/output signals are changed or a combination with a signal inversion circuit is made. In this way, it is possible to realize a phase adjustment circuit, which is capable of performing phase adjustment in a desired angle range.

Moreover, the circuit shown in FIG. 6A or 6B has the configuration of analogy changing a resistance. In contrast to the foregoing analog configuration, the resistance may be digitally changed to perform phase adjustment. FIG. 7 shows the circuit configuration for realizing the foregoing digital phase adjustment. According to the configuration of FIG. 7, a signal group having the most preferable phase is selected from a plurality of phase signals. FIG. 7 shows the circuit configuration for performing phase adjustment with respect to a phase difference $\Delta$ in a range of $0° \leq \Delta \leq 90°$. According to the foregoing configuration of FIG. 7, phase adjustment is automatically performed.

Except the configurations shown FIGS. 6A, 6B and 7, various configurations are applicable as the phase shifter 701a so long as the phase of a group of periodic signals output from the same photodetector is simultaneously shifted by a phase difference $\Delta$. For example, the following configuration may be employed. Specifically, both phases of output signals VA1, VB1, VAB1 and VBB1 of the first photodetector 32 and phases of output signals VA2, VB2, VAB2 and VBB2 of the second photodetector 33 are shifted to offset a phase difference $\Delta$. Moreover, a signal to be executed a phase shift may be changed between output signals VA1, VB1, VAB1 and VBB1 of the first photodetector 32 and output signals VA2, VB2, VAB2 and VBB2 of the second photodetector 33. In addition, the phase shifter 701a may be realized using an operation circuit.

The absolute displacement operation unit 702 calculates an absolute displacement of a displacement detection target based on the output signal of the first photodetector 32 and the output signal of the second photodetector 33 in which a phase is shifted by the phase shifter 701a. The relative displacement operation unit calculates a relative displacement of a displacement detection target based on the output signal of the first photodetector 32 and the output signal of the second photodetector 33 in which a phase is shifted by the phase shifter 701a.

FIG. 8 is a block diagram showing a first configuration of a signal processing apparatus 70. The signal processing apparatus 70 shown in FIG. 8 includes in-phase noise removal units 704a, 704b, a phase adjustment unit 701, an amplitude component differential calculation unit 705, an in-phase synthesizer unit 706, an absolute displacement operation unit 702 and a relative displacement operation unit 703. In this case, the amplitude component differential calculation unit 705, in-phase synthesizer unit 706, absolute displacement operation unit 702 and relative displacement operation unit 703 function as an example of a "signal processing unit".

First, the configuration and operation related to a pre-processing of output signals of first and second photodetectors 32 and 33 will be described below.

In-phase noise removal units 704a and 704b calculate the difference between output signals having different phase of 180° (i.e., ½ period). Specifically, the in-phase noise removal unit 704a executes a calculation shown by the following equation (6). Moreover, the in-phase noise removal unit 704b executes a calculation shown by the following equation (7).

$$Va1=VA1-VAB1$$
$$Vb1=VB1-VBB1 \quad (6)$$
$$Va2=VA2-VAB2$$
$$Vb2=VB2-VBB2 \quad (7)$$

Figure 9A:
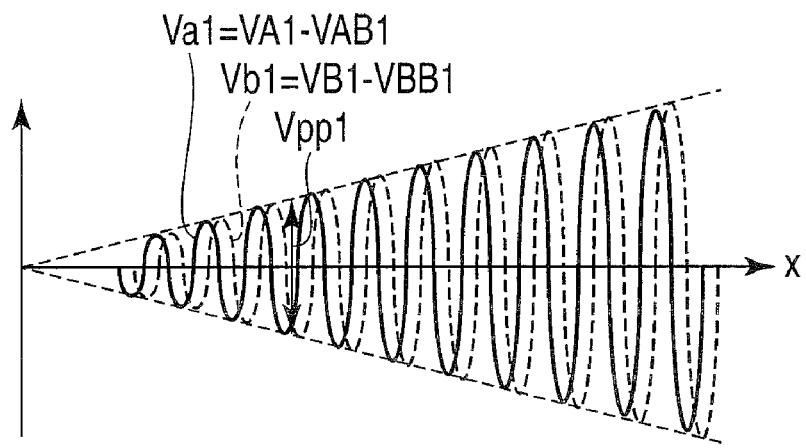
FIGS. 9A and 9B are views showing an example of the output characteristic of an in-phase noise removal unit.
Figure 9B:
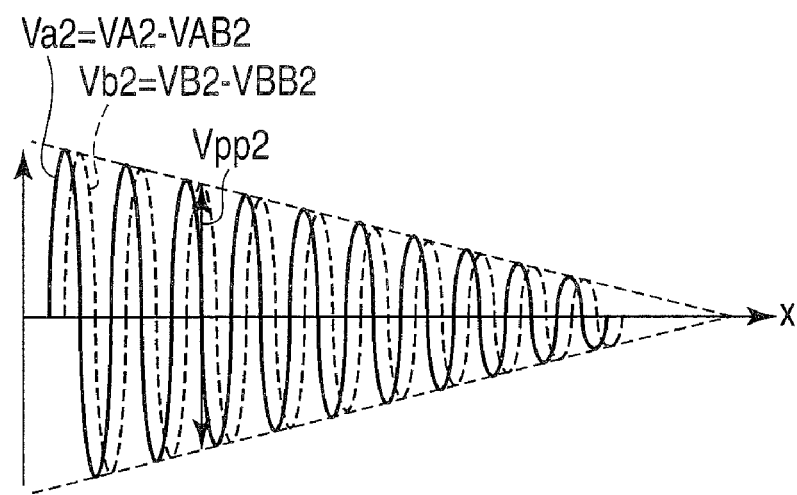

FIG. 9A shows an output signal of the in-phase noise removal unit 704a, and FIG. 9B shows an output signal of the in-phase noise removal unit 704b. According to the operation by the in-phase noise removal unit 704a, an influence of offset, noise and DC components contained in the output signal of the first photodetector 32 is cancelled. Thus, output signals Va1 and Vb1 having a phase difference $\phi$ (90° in this embodiment) are obtained. Moreover, according to the operation by the in-phase noise removal unit 704b, an influence of offset, noise and DC components contained in the output signal of the second photodetector 33 is cancelled. Thus, output signals Va2 and Vb2 having a phase difference $\phi$ (90° in this embodiment) are obtained.

In this case, if an influence of a noise component and so on is not taken into consideration, there is no need to provide the foregoing in-phase noise removal units 704a and 704b. In such a case, output signals VA1, VB1, VA2 and VB2 only may be input with respect to signals from an optical signal output device.

The phase adjustment unit 701 shifts the phase of at least one (output signals Va2, Vb2 only in FIG. 8) of output signals Va1 and Vb1 of the in-phase noise removal unit 704a and output signals Va2 and Vb2 of the in-phase noise removal unit 704b by $\Delta$ using the phase shifter 701a. In this case, a phase difference $\Delta$ between output signals Va1, Vb1 and Va2, Vb2, that is, between output signals VA1, VB1, VAB1, VBB1 of the first photodetector 32 and output signals VA2, VB2, VAB2, VBB2 of the second photodetector 33 is detected by means of a phase difference detection circuit, for example. This phase difference detection circuit is provided independently from the signal processing apparatus 70. Besides, for example, the foregoing phase difference $\Delta$ is detectable according to an amplitude change before and after addition of signals by the amplitude component differential calculation unit 705 and the in-phase synthesizer unit 706, which will be described later.

The following method is given as a method of detecting a phase difference between a plurality of periodic signals having the same period and a phase difference with respect to a periodic signal having a specified phase. For example, a phase difference between points capable of specifying a phase of the peak of a waveform captured by an oscilloscope is detected. Moreover, the phase difference is calculated using an elliptic shape of a Lissajous waveform generated by two sine wave signals. According to the elliptic Lissajous waveform, a phase difference between two signals is calculated from the amplitude of two signals and a tilted angle with respect to coordinate axes corresponding to long- and short-axis of an ellipse.

Moreover, if the sum of two signals is obtained after the phase of one of two sine wave signals is shifted, a phase difference between original two signals is calculated from a phase shift amount in which the amplitude of the sum signal becomes the maximum or the minimum. In this case, the following methods are given as a method of giving a phase shift amount. One is a method of changing the phase shift amount of one of a couple of two signals within a range of 180° or 360°. The other is a method of giving a well-known phase shift amount having different value to one of several couples of two signals. The former method of changing the phase shift amount of one of a couple of two signals has the following methods. One is a method of sweeping a predetermined range in a predetermined step to detect a phase difference. The other is a method of gradually approaching a phase difference to a desired phase difference, that is, the optimal value using an optimization process.

The foregoing methods of detecting a phase difference described herein are given as one example, therefore, other methods except the foregoing methods may be employed to detect a phase difference.

The amplitude component differential calculation unit 705 extracts a amplitude component Vpp1 of output signals Va1 and Vb1 of the phase adjustment unit 701 and a amplitude component Vpp2 (same as output signals Va2 and Vb2) of output signals Va2' and Vb2' thereof. Then, the unit 705 calculates the sum of the amplitude components Vpp1 and Vpp2 and the difference between the amplitude components Vpp1 and Vpp2.

Figure 10:
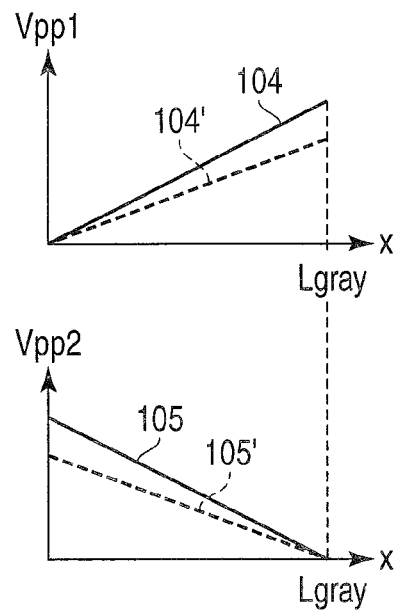
FIG. 10 is a graph showing the characteristic of amplitude components Vpp1 and Vpp2.

FIG. 10 shows each of characteristics of the foregoing amplitude components Vpp1 and Vpp2. As described above, the modulation code pattern of the gray track 51 has an optical characteristic such that an effective reflectance gradually increases along the X-direction of FIG. 1. Moreover, the modulation code pattern of the gray track 52 has an optical characteristic such that an effective reflectance gradually decreases along the X-direction of FIG. 1. Thus, the amplitude component Vpp1 has a simply increasing characteristic 104 with respect to a displacement x as can be seen from FIG. 10. Conversely, the amplitude component Vpp2 output from the second photodetector 33 has a simply decreasing characteristic 105 with respect to a displacement x as can be seen from FIG. 10. As is evident from FIG. 10, the foregoing amplitude components Vpp1 and Vpp2 are defined by the following equations (8) and (9).

$$Vpp1 = a \cdot x \qquad (8)$$

$$Vpp2 = -a \cdot x \ (x - Lgray) \qquad (9)$$

Herein, "Lgray" denotes a length of a predetermined section that an effective reflectance of the scale 50 gradually increases or decreases. Moreover, "a" denotes a change (i.e., gradient of Vpp1 shown in FIG. 10) of the Vpp1 when a displacement detection target displaces by a unit distance. In this case, when Vppmax is set as the maximum amplitude of a signal of each of first and second photodetectors 32 and 33, the gradient "a" is obtained from the following equation (10).

$$a = Vppmax/Lgray \qquad (10)$$

The calculation results of the sum and difference of Vpp1 and Vpp2 are expressed by the following equations (11) and (12)

$$Vpp1 + Vpp2 = a \cdot Lgray \qquad (11)$$

$$Vpp1 - Vpp2 = 2a \cdot x - a \cdot Lgray \qquad (12)$$

Figure 11:
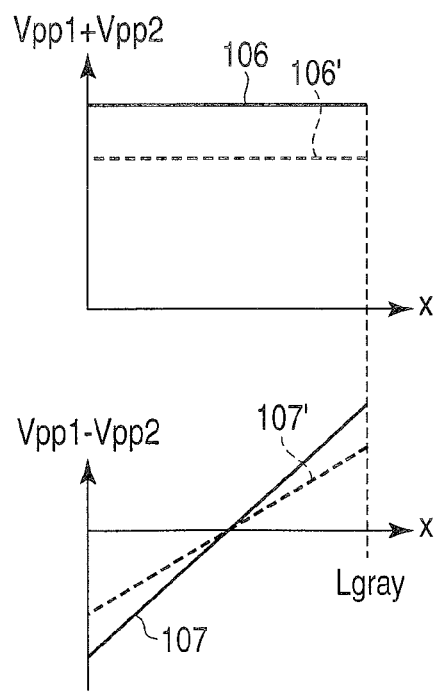
FIG. 11 is a graph showing an example of the characteristic of (Vpp1+Vpp2) and (Vpp1−Vpp2)

The characteristic of equation (11) is shown by a characteristic line 106 in FIG. 11, and the characteristic of equation (12) is shown by a characteristic line 107 in FIG. 11. According to the operation by the phase adjustment unit 701, each calculation shown by equations (11) and (12) is correctly carried out.

The configuration and operation related to an absolute displacement operation will be described below.

The absolute displacement operation unit 702 executes an operation for calculating an absolute displacement x using the sum (Vpp1+Vpp2) and difference (Vpp1−Vpp2) of the amplitude component operated by the amplitude component differential calculation unit 705. The foregoing unit 702 executes a calculation shown by the following equation (13).

$$(Vpp1 + Vpp2)/(Vpp1 - Vpp2) \qquad (13)$$

More specifically, the absolute displacement x is calculated by the following equation (14) using the calculation result obtained from equation (13).

$$x = \alpha \cdot (Vpp1 - Vpp2)/(Vpp1 + Vpp2) + \beta \qquad (14)$$

where, α (≠1) and β are coefficients.

It is very easy to make a conversion from equation (13) for calculating the absolute displacement x into equation (14). Thus, the calculation of equation (14) may not necessarily be carried out by the absolute displacement operation unit 702. In this case, a conversion by equation (14) may be carried out by a host computer (not shown), which is located at the after-stage of the signal processing apparatus 70.

According to the foregoing example, amplitude components Vpp1 and Vpp2 are used as a method of operating an absolute displacement. Amplitude components of output signals of first and second photodetectors 32 and 33, that is, Vpp1 and Vpp2 may have the following relationship. Namely, the sign of increase and decrease with a displacement is reverse, and the increase and decrease absolute value is equal and further, the sum is constant. For example, the foregoing equations (11) to (14) may be realized using DC level signals of FIGS. 4A and 4B, that is, VDC1 and VDC2.

When equations (11) and (12) are substituted for equation (13), the following equations (15) and (16) are obtained.

$$(Vpp1 - Vpp2)/(Vpp1 + Vpp2) = 2/Lgray \cdot x - 1 \qquad (15)$$

$$x = Lgray \cdot ((Vpp1 - Vpp2)/(Vpp1 + Vpp2) + 1)/2 \qquad (16)$$

In the foregoing equation (15), (Vpp1−Vpp2)/(Vpp1+Vpp2) does not depend on the maximum amplitude Vppmax and the gradient a. Moreover, "Lgray" is a fixed value, which is determined in a design of the scale 50. Thus, even if the foregoing "Vppmax" and "a" are changed during the operation of the optical displacement detection system 10, a displacement x shown in equation (16) is unchanged.

Usually, the output signal from the light source and the sensibility characteristic of photodetectors change due to an age-based change of an optical displacement detection system or a change of environment temperature. Moreover, even if the output signal from the light source and the sensibility characteristic of photodetectors are unchanged, the quantity of light detected by a photodetector changes due to a factor of an attaching shakiness of a sensor head and a scale. In general, the output amplitude and the sum/difference components from a sensor head considerably changes due to the foregoing change factors. For example, as shown in FIGS. 10 and 11, the characteristic changes from the solid line 104 to the broken line 104', and changes from the solid line 105 to the broken line 105', and further, changes from the solid line 106 to the broken line 106', and further, changes from the solid line 107 to the broken line 107'. In this case, it is difficult to accurately detect an absolute position.

According to this embodiment, the sum/difference of Vpp1 and Vpp2 are calculated, and further, a ratio of the sum/difference of Vpp1 and Vpp2 is calculated. In this way, it is possible to obtain a displacement, which cancels changing components, that is, the gradient "a" and the maximum amplitude Vppmax, from the foregoing equation (16). Moreover, the characteristic of equation (15) is shown by the solid line 108 in FIG. 12. The characteristic shown in FIG. 12 does not depend on a gradient "a" and the maximum amplitude Vppmax. Therefore, it is possible to calculate an absolute displacement x without calculating the foregoing gradient "a" and maximum amplitude Vppmax. As a result, this serves to dispense the initial setting of a sensor head and a scale in order to calculate an absolute displacement x.

The configuration and operation related to a relative displacement operation will be described below.

The in-phase synthesizer unit 706 adds in-phase signals of output signals Va1, Vb1, Va2' and Vb2' from the phase adjustment unit 701. Namely, the in-phase synthesizer unit 706 executes the following equation (17).

$$Va = Va1 + Va2'$$
$$Vb = Vb1 + Vb2' \quad (17)$$

Signals Va and Vb having a phase difference of 90° (i.e., ¼ period) shown in FIG. 13 are obtained from the in-phase synthesizer unit 706.

The relative displacement operation unit 703 converts a displacement into angle information based on a phase angle of signals Va and Vb obtained by the in-phase synthesizer unit 706. Then, the unit 703 makes a comparison between the angle information and the previous calculation result to calculate a displacement corresponding to a resolving power. When executing the foregoing processing, the unit 703 may directly calculate the amplitude value to convert it into angle information so that a displacement is calculated. Or, the unit 703 may calculate a displacement using a so-called ROM table reference method.

As described above, according to this embodiment, the optical signal output device is provided with two photodetectors. Absolute displacement and relative displacement of a displacement detection target are detected using two signals output from the foregoing photodetectors. These signals have the following relationship that a sign of increase/decrease of an amplitude component with displacement is reverse, and the absolute value of the increase/decrease is equal, and further, the sum is constant. In this way, it is possible to keep a resolving power at high level in both of absolute and relative displacement detections and to realize improvement of detection sensibility of an absolute position and enlargement of a detection range.

Moreover, according to this embodiment, before output signals of two photodetectors are added and subtracted, the phase of at least output signal of one photodetector is shifted by a phase difference Δ. In this way, an influence by an error when a displacement is detected is reduced, and thereby, it is possible to stably and precisely detect a displacement.

Various modification examples of this embodiment will be described below.

In FIG. 1, one light source 31 only is shown; however, the number of light sources is not limited to one. Of course, a plurality of light sources may be provided. Moreover, the number of sensor heads is not limited to one. For example, the following configuration may be employed such that a sensor head is provided independently with respect to each of gray tracks 51 and 52. According to the foregoing configuration, an independent light source is used for each gray track; therefore, a degree of freedom increases in a distance between gray tracks in its arrangement. If there is a difference between the quantity of light of two light sources and if it is required to precisely detect a displacement, it is desired to correct the difference in quantity of light.

Figure 14:
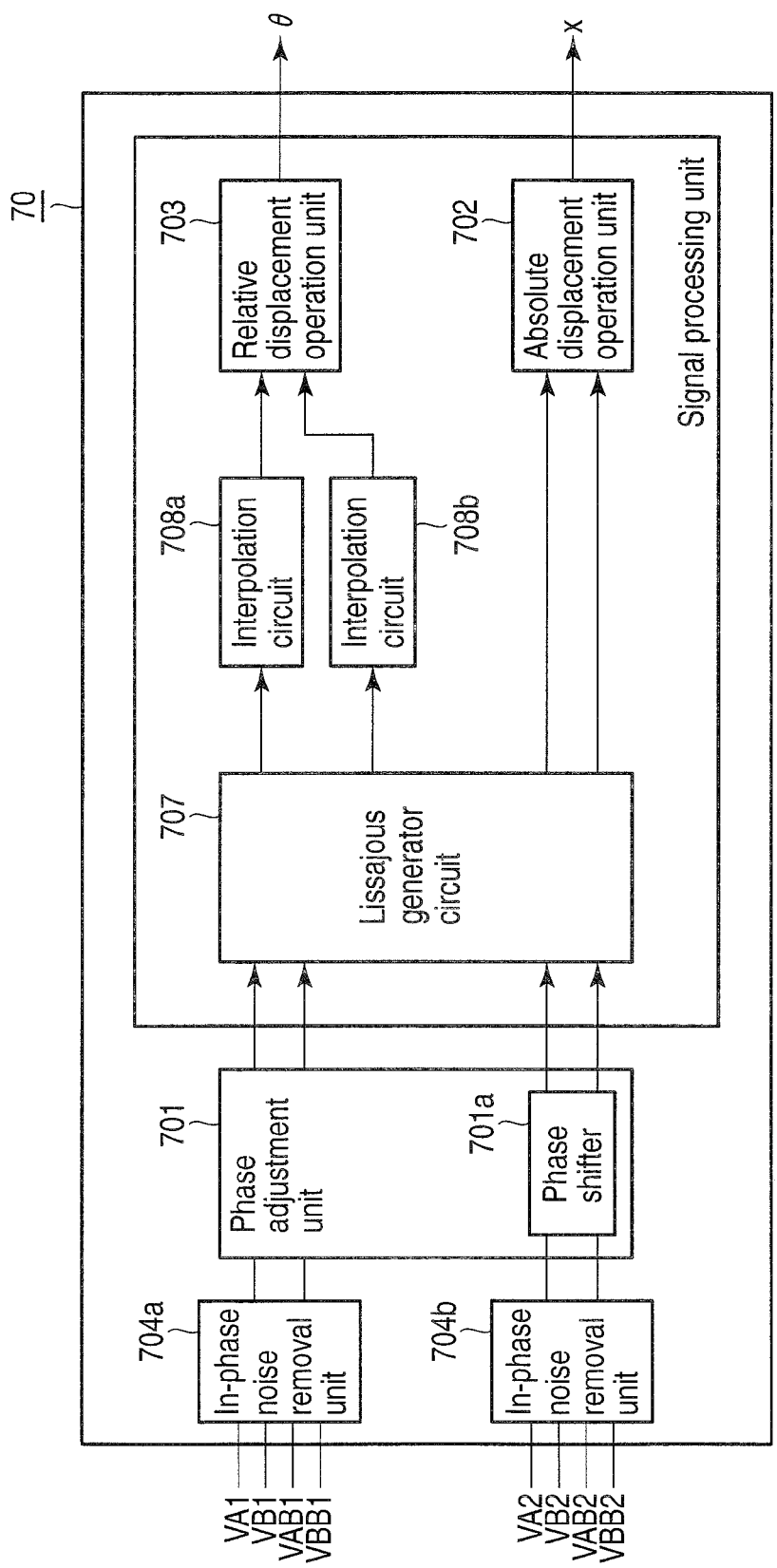
FIG. 14 is a block diagram showing a second configuration of a signal processing apparatus.

FIG. 14 is a block diagram showing a second configuration according to a modification example of a signal processing apparatus 70. The signal processing apparatus 70 shown in FIG. 14 includes in-phase noise removal units 704a, 704b, a phase adjustment unit 701, a Lissajous generator circuit 707, an absolute displacement operation unit 702, interpolation circuits 708a, 708b, and a relative displacement operation unit 703. According to the configuration shown in FIG. 14, an absolute displacement and a relative displacement are detected based on a Lissajous figure.

First, the configuration and operation related to the pre-processing of output signals of first and second photodetectors will be described below. In this case, the configuration and operation of the foregoing in-phase noise removal units 704a, 704b and phase adjustment unit 701 are the same as shown in FIG. 8. Therefore, the explanation of these in-phase noise removal units 704a, 704b and phase adjustment unit 701 is omitted.

The Lissajous generator circuit 707 generates a Lissajous figure from each of output signals Va1, Vb1, Va2' and Vb2' output from the phase adjustment unit 701.

Figure 15:
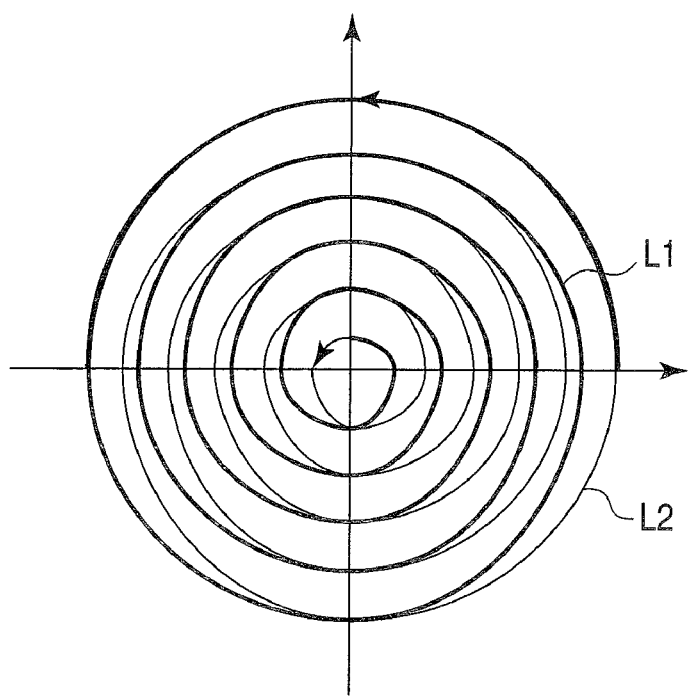
FIG. 15 is a view showing an example of a Lissajous figure generated by a Lissajous generator circuit.

Output signals Va1 and Vb1 from the phase adjustment unit 701 are set as cosine and sine components to generate a Lissajous figure. Moreover, output signals Va2' and Vb2' from the phase adjustment unit 701 are set as cosine and sine components to generate a Lissajous figure. As can be seen from FIG. 9A, output signals Va1 and Vb1 has a characteristic that the amplitude gradually increases according to a displacement. Conversely, as can be seen from FIG. 9B, output signals Va2' and Vb2' has a characteristic that the amplitude gradually decreases according to a displacement. (FIG. 9B shows output signals Va2 and Vb2 from the in-phase noise removal unit 704b; however, the phase only is different between Va2, Vb2 and Va2', Vb2, and therefore, the amplitude is the same.) In this way, based on the foregoing output signals Va1 and Vb1, a Lissajous figure is drawn. As shown in FIG. 15, the Lissajous figure has a spiral locus L1 such that a radius (i.e., distance from the origin) gradually increases. Moreover, based on the foregoing output signals Va2' and Vb2', a Lissajous figure is drawn. As shown in FIG. 15, the Lissajous figure has a spiral locus L2 such that a radius gradually decreases.

The configuration and operation related to an absolute displacement operation will be described below.

The absolute displacement operation unit 702 of FIG. 14 executes a calculation shown by the following equation (18) with respect to radiuses r1 and r2 of Lissajous figures L1 and L2 generated by the Lissajous generator circuit 707. In this way, the unit 702 calculates an absolute displacement.

$$(r1-r2)/(r1+r2) \quad (18)$$

The foregoing equation (18) is equivalent to equation (13). Therefore, an actual absolute displacement x is calculated by a calculation shown in the following equation (19) using the calculation result of equation (18).

$$x = \alpha \cdot (r1-r2)/(r1+r2) + \beta \quad (19)$$

According to the operation by the phase adjustment unit 701, the foregoing calculations shown in equations (18) and (19) are correctly performed.

In place of the calculation shown in equation (18), the difference between radiuses r1 and r2 is divided by the maximum radius rmax (corresponding to the foregoing Vmax) of a Lissajous figure to calculate an absolute displacement. In other words, a calculation shown in the following equation (20) may be executed.

$$(r1-r2)/rmax \quad (20)$$

According to the calculation of an absolute position, the absolute displacement operation unit 702 calculates a rough absolute position. Thereafter, the foregoing rough absolute position may be combined with a relative position obtained by the relative displacement operation unit 703 to obtain a high precious absolute position. Moreover, for example, a simple circuit element such as a comparator detects signals to make a comparison determination. Of course, an absolute position may be calculated directly based on an analog value.

The configuration and operation related to a relative displacement operation will be described below.

The interpolation circuit 708a of FIG. 14 executes an interpolation processing using cosine and sine components of the Lissajous figure L1 generated by the Lissajous generator circuit 707 to acquire angle information θ1. Moreover, the interpolation circuit 708b executes an interpolation processing using cosine and sine components of the Lissajous figure L2 generated by the Lissajous generator circuit 707 to acquire angle information θ2.

Specifically, the interpolation circuit 708a executes a calculation of $\theta1=\tan^{-1}(Vb1/Va1)$ based on cosine and sine components ($=Va1$ and $Vb1$) of the Lissajous figure L1 generated by the Lissajous generator circuit 707 to acquire angle information. Moreover, the interpolation circuit 708b executes a calculation of $\theta2=\tan^{-1}(Vb2'/Va2')$ based on cosine and sine components ($=Va2'$ and $Vb2'$) of the Lissajous figure L2 generated by the Lissajous generator circuit 707 to acquire angle information. In this case, the foregoing angle information is finely operated, and thereby, it is possible to detect a fine displacement compared with a spatial period ps.

Of course, analog output signals from the Lissajous generator circuit 707 are digitized to generate address data. Then, the circuit 707 refers to an angle information table recorded in each interpolation circuit based on the foregoing address data to execute an interpolation processing. Moreover, depending on a resolving power, a simple circuit element such as a comparator detects a signal directly using an analog value to calculate a displacement.

The relative displacement operation unit 703 operates angle information θ1 and θ2 operated by the interpolation circuits 708a and 708b to remove an error component. The error component serves to operate the difference between the removed current angle information and angle information acquired at the previous timing. In this case, a processing for "removing an error component" is not limited to a processing for taking an average value of angle information output from interpolation circuits 708a and 708b. For example, the following three examples of processing are included as the foregoing processing for "removing an error component".

EXAMPLE 1

Output angle information only corresponding to the original signal having larger amplitude of angle information operated by interpolation circuits 708a and 708b.

EXAMPLE 2

In accordance with the magnitude of the amplitude of the original signal, angle information from interpolation circuits 708a and 708b are weighted to execute an average processing.

EXAMPLE 3

When a processing starts, an error component is removed.

A change θ of the angle information operated by the relative displacement operation unit 703 is equivalent to a displacement in a spatial period ps. A conversion from θ to a relative displacement xp is performed by the following equation (21).

$$xp=ps \cdot \theta/n \quad (21)$$

Actually, the relative displacement xp shown in the foregoing equation (21) is able to be calculated by angle information only from any of interpolation circuits 708a and 708b. However, if a relative displacement is calculated from one angle information only, a calculation error of a relative displacement becomes considerably large when amplitude is small. In contrast to above, according to this embodiment, the relative displacement is calculated using angle information from two interpolation circuits 708a and 708b. In this case, if the amplitude of one signal is small, the amplitude of the other signal becomes large. Therefore, an influence by a calculation error is cancelled; as a result, it is possible to stably and high precisely operate a relative position.

Figure 16:
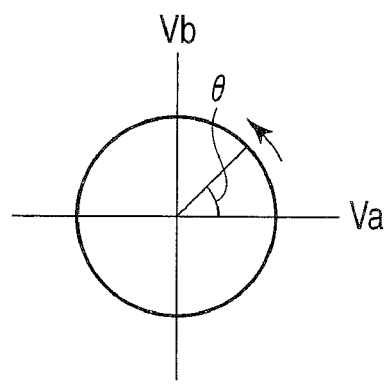
FIG. 16 is a view to explain a relative displacement operation based on a Lissajous figure.

Another operation of a relative displacement based on a Lissajous figure will be described below. First, the Lissajous generator circuit 707 adds in-phase signals of output signals Va1, Vb1, Va2' and Vb2' from the phase adjustment unit 701. In this case, as shown in FIG. 13, ¼ period phase difference signals Va and Vb having a fixed amplitude with respect to a displacement x are obtained. Herein, when the signal Va is set as a cosine component and the signal Vb is set as a sine component to generate a Lissajous figure, a circular locus drawn by a fixed radius shown in FIG. 16 is obtained. A relative displacement xp is calculated from a change of a phase angle θ on the circumference. According to the foregoing operation, it is possible to stably and high precisely operate a relative position.

FIG. 17 is a block diagram showing the configuration of a phase adjustment unit 701 according to a first modification example. According to the configuration of the first modification example, the phase adjustment unit 701 is provided with a phase difference detector 701b in addition to the configuration shown in FIG. 5.

The phase difference detector 701b detects a phase difference Δ between mutually corresponding signals (having a specific phase, i.e., output signals VA1 and VA2) of output signal VA1, VB1, VAB1, VBB1 of a first photodetector 32 and output signal VA2, VB2, VAB2, VBB2 of a second photodetector 33. Then, the detector 701b outputs the detected phase difference Δ to a phase shifter 701a. The phase shifter 701a shifts each phase of output signal VA2, VB2, VAB2, VBB2 of the second photodetector 33 by the phase difference Δ detected by the phase difference detector 701b.

In FIG. 17, each phase of output signal VA2, VB2, VAB2, VBB2 of the second photodetector 33 is shifted; in this case, each phase of output signals VA1, VB1, VAB1, VBB1 of the first photodetector 32 may be shifted. Moreover, each phase of both photodetectors may be shifted. In FIG. 17, a phase difference between a couple of output signals comprising output signals VA1 and VA2; in this case, all phase differences of four couples of output signals may be detected. In this case, an average value of the foregoing phase differences of four couples of output signals is input to the phase shifter 701a.

According to the configuration of FIG. 17, all processing related to phase adjustment can be carried out in the signal processing apparatus 70. In addition, a phase is detectable as the necessity arises; therefore, adjustment is carried out based on the newest detection result. In particular, a phase is always detected, and thereby, real-time phase adjustment is possible.

Figure 18:
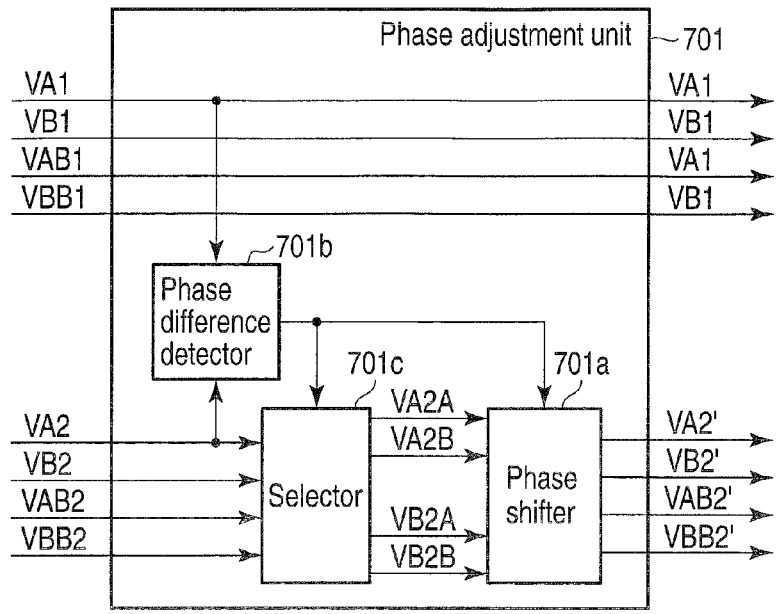
FIG. 18 is a block diagram showing the configuration of a second modification example of a phase adjustment unit.

FIG. 18 is a block diagram showing the configuration of a phase adjustment unit 701 according to a second modification example. According to the configuration of the second modification example, the phase adjustment unit 701 is provided with a selector 701c in addition to the configuration shown in FIG. 17. In FIG. 18, the phase difference Δ detected by the phase difference detector 701b is input to the selector 701c and the phase shifter 701a.

The selector 701c rearranges output signal VA2, VB2, VAB2, and VBB2 of the second photodetector 33 in accordance with the phase difference Δ detected by the phase difference detector 701b. Then, the selector 701c outputs rearranged signals VA2, VB2, VAB2, and VBB2 to the phase shifter 701a. The phase shifter 701a shifts each phase of rearranged signals VA2A, VA2B, VB2A and VB2B. Then, the phase shifter 701a outputs phase-shifted signals VA2A, VA2B, VB2A and VB2B as outputs VA2A', VA2B', VB2A' and VB2B'.

The foregoing rearrangement by the selector 701c is made so that a phase shift amount by the phase shifter 701a becomes small. Specifically, output signals VA2, VB2, VAB2, and VBB2 each have a phase difference by ϕ (90° (¼ period) in this embodiment). Thus, the selector 701c rearranges signals, and thereby, a phase shift at a unit of ϕ is performed before signals are input to the phase shifter 701a. In this way, the phase shift amount of the phase shifter 701a is reduced.

Figure 19:
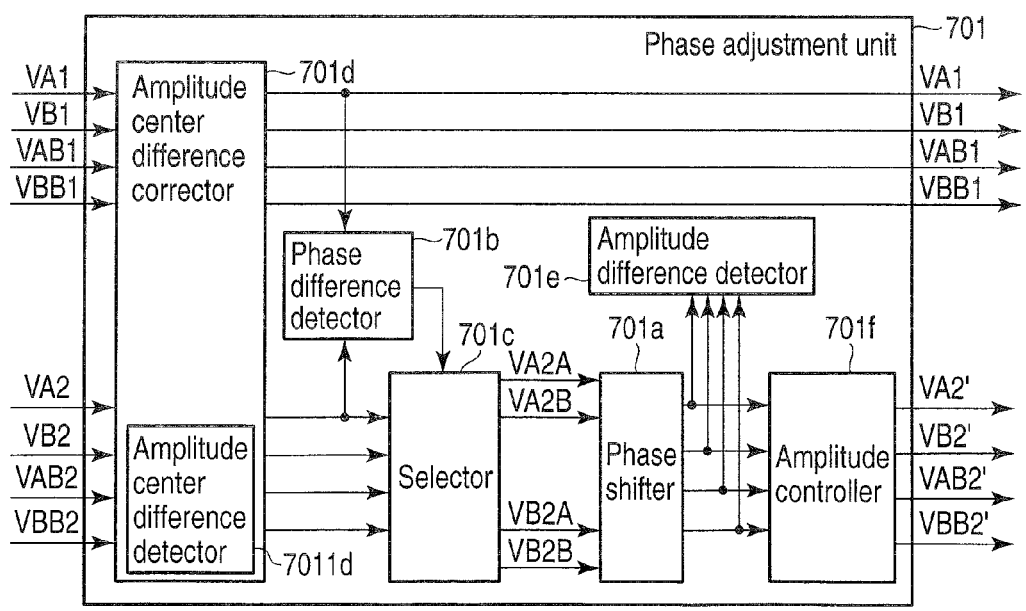
FIG. 19 is a block diagram showing the configuration of a third modification example of a phase adjustment unit.

FIG. 19 is a block diagram showing the configuration of a phase adjustment unit 701 according to a third modification example. According to the configuration of the third modification example, the phase adjustment unit 701 is provided with an amplitude center difference corrector 701d, an amplitude difference detector 701e and an amplitude controller 701f in addition to the configuration shown in FIG. 18.

The amplitude center difference corrector 701d has an amplitude center difference detector 7011d. The amplitude center difference detector 7011d detects a difference from a predetermined value of a DC level of the each of amplitude center of output signals VA1, VB1, VAB1, VBB1 of the first photodetector 32 and output signal VA2, VB2, VAB2, VBB2 of the second photodetector 33. Or, the detector 7011d detects a difference between a DC level of the amplitude center of output signals VA1, VB1, VAB1, VBB1 of the first photodetector 32 and a DC level of the amplitude center of output signal VA2, VB2, VAB2, VBB2 of the second photodetector 33. Then, the detector 7011d corrects any one DC level of the amplitude center of output signals VA1, VB1, VAB1, VBB1 and output signal VA2, VB2, VAB2, VBB2 to compensate (offset) the difference from a predetermined value of a DC level of the amplitude center detected by the detector 7011d or the difference between DC levels of the amplitude center.

The amplitude difference detector 701e detects an amplitude difference between output signal VA2, VB2, VAB2 and VBB2 of the second photodetector 33. The amplitude controller 701f has amplitude control circuits corresponding to the number of output signals of the phase shifter 701a (four output signals, that is, VA2', VB2', VAB2', VBB2' in FIG. 19). Then, the controller 701f performs amplitude control of output signals VA2', VB2', VAB2' and VBB2' in accordance with the amplitude difference detected by the amplitude difference detector 701e. The amplitude control circuit has amplifier circuits, for example. The amplitude control is performed to adjust the amplitude of each output signal, and to set a desired amplitude and amplitude ratio. In this way, it is possible to set an influence of first and second photodetector 32 and 33 to a signal obtained as the addition/subtraction result of a signal to a desired ratio. Namely, an influence of the original signal of first and second photodetector 32 and 33 to signal information such as the amplitude and phase of the added/subtracted signal is set to a predetermined ratio. Therefore, it is possible to avoid position detection depending on the output of one photodetector only, and thus, to perform a high-precision position detection.

In FIG. 18, the amplitude difference detector 701e and the amplitude controller 701f are provided in the phase adjustment unit 701. In this case, the foregoing amplitude difference detector 701e and amplitude controller 701f may be provided in the after-stage of the phase adjustment unit 701. Moreover, in FIG. 18, the amplitude control is carried out with respect to output signals of the phase shifter 701a. In this case, the foregoing amplitude difference detector 701e and amplitude controller 701f may be provided in the pre-stage of the phase adjustment unit 701 to carry out amplitude adjustment before phase shift.

Figure 20:
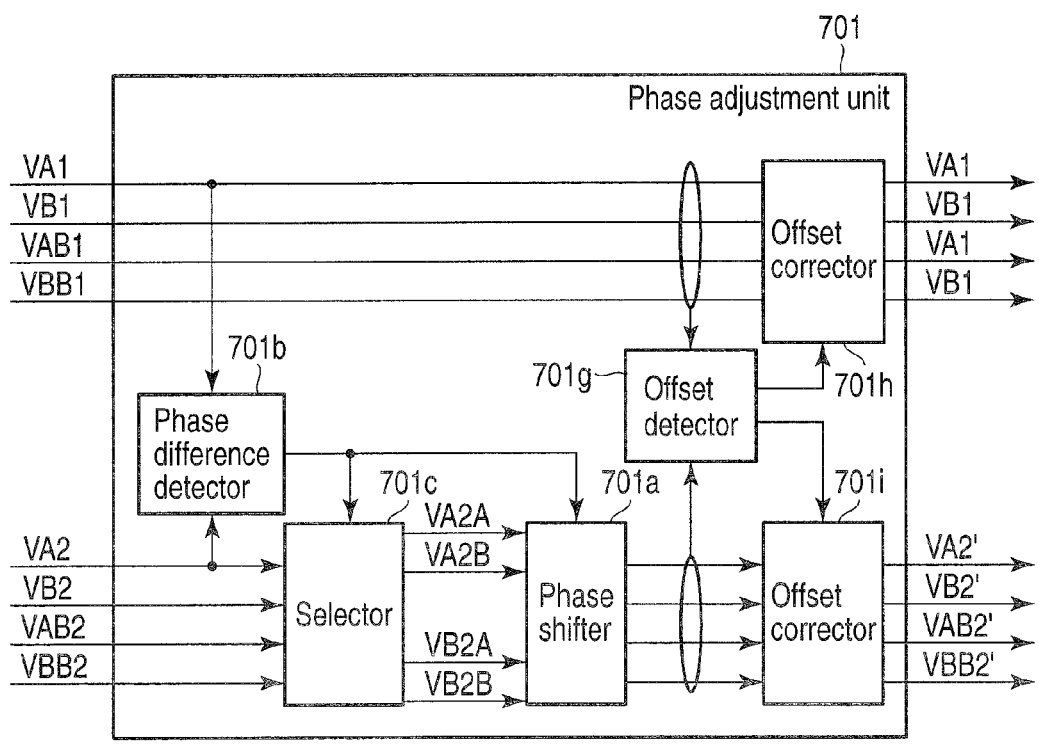
FIG. 20 is a block diagram showing the configuration of a forth modification example of a phase adjustment unit.
Figure 22:
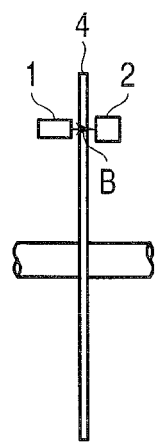
FIG. 22 is a side view showing an optical signal output device used for a conventional photoelectric detection system.
Figure 23:
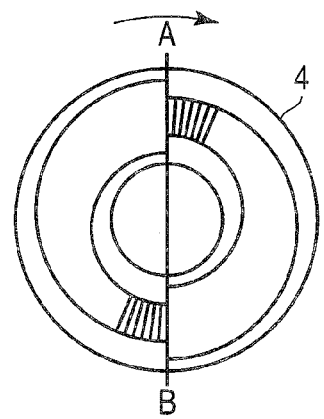
FIG. 23 is a top plan view showing a scale of a conventional photoelectric detection system.
Figure 24:
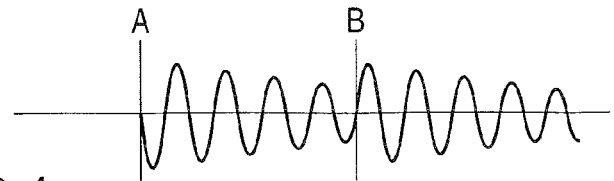
FIG. 24 is a view showing an output signal of a photodetector of a conventional photoelectric detection system.

FIG. 20 is a block diagram showing the configuration of a phase adjustment unit 701 according to a fourth modification example. According to the configuration of the fourth modification example, the phase adjustment unit 701 is provided with an offset detector 701g, offset correctors 701i and 701h in addition to the configuration shown in FIG. 18.

The offset detector 701g detects amounts of offsets with respect to a reference voltage of output signals VA1, VB1, VAB1 and VBB1 of the first photodetector 32 and output signals VA2', VB2', VAB2' and VBB2' of the phase shifter 701a. Or, the offset detector 701g detects amounts of offsets of output signals VA2', VB2', VAB2' and VBB2' of the phase shifter 701a with respect to output signals VA1, VB1, VAB1 and VBB1 of the first photodetector 32. The foregoing offset correctors 701i and 701h corrects offsets of at least any one of output signals VA1, VB1, VAB1 and VBB1 of the first photodetector 32 and output signals VA2', VB2', VAB2' and VBB2' of the phase shifter 701a to dispense the offsets detected by the offset detector 701g. For example, the foregoing offset correction is made according to a level shift. FIG. 20 shows an example in which offset correction of both of the photodetector 32 and the phase shifter 701a.

If a position detection such as a relative position and an absolute position is performed using a signal having an offset, this is one of big factors of causing an error. According to the configuration shown in FIG. 20, offset correction is made, and thereby, high-precision position detection is possible compared with performing phase adjustment only.

As shown in FIG. 20, the phase adjustment unit 701 is provided with the offset detector 701g, offset correctors 701i and 701h. In this case, the offset detector 701g, offset correctors 701i and 701h may be located at the after-stage of the phase adjustment unit 701. According to the example shown in FIG. 20, an offset correction is carried out with respect to output signals of the phase shifter 701a. In this case, the foregoing offset detector 701g, offset correctors 701i and 701h may be located at the pre-stage of the phase adjustment unit 701 to execute an offset correction before phase shift.

Moreover, the amplitude control described in FIG. 19 and the offset correction described in FIG. 20 may be performed in combination with each other. In this case, the foregoing amplitude control and offset correction may be carried out simultaneously and one of them may be carried out in advance.

In the foregoing various phase adjustments, for example, even if a phase difference shifts by about 5°, the amplitude error occurs about 0.5% only. Thus, depending on the usage, a phase has no need to fully coincide between output signals of the first photodetector 32 and output signals of the second photodetector 33. In this case, for example, a couple of signals having almost no phase difference may be selected from a plurality of candidates.

FIG. 21 is a block diagram showing the configuration of the foregoing modification example. According to the configuration of the modification example, a phase adjustment unit 701 includes various circuits corresponding to the number of input signals (eight, that is, output signals VA1, VB1, VAB1, VBB1 of a first photodetector and output signals VA2, VB2, VAB2, VBB2 of a second photodetector in FIG. 21). Specifically, the unit 701 includes buffer circuits Buf, amplitude difference detection circuits 801a, 801b, a gain instruction circuit 802, amplitude control circuits 803a, 803b, and switch circuits 804. Further, the unit 701 includes buffer circuits Buf, which is connected between the switch circuit 804 and amplitude control circuits 803a, 803b, a phase difference detector 805, a connection change operator 806, a switch drive circuit 807 and adder circuits 808.

The amplitude difference detection circuit 801a detects an amplitude difference between output signals VA1, VB1, VAB1 and VBB1 of a first photodetector 32. Moreover, the amplitude difference detection circuit 801b detects an amplitude difference between output signals VA2, VB2, VAB2 and VBB2 of a second photodetector 33.

The gain instruction circuit 802 instructs a gain value of each of output signals VA1, VB1, VAB1 and VBB1 of the first photodetector 32 to the amplitude control circuit 803a. In this case, the circuit 802 gives instructions to compensate (dispense) the amplitude difference between output signals VA1, VB1, VAB1 and VBB1 of the first photodetector 32 detected by the amplitude difference detection circuit 801a. Moreover, the gain instruction circuit 802 instructs a gain value of each of output signals VA2, VB2, VAB2 and VBB2 of the second photodetector 33 to the amplitude control circuit 803b. In this case, the circuit 802 gives instructions to compensate the amplitude difference between output signals VA2, VB2, VAB2 and VBB2 of the second photodetector 33 detected by the amplitude difference detection circuit 801b.

According to the modification example, of FIG. 21, signals are only rearranged without carrying out phase shift to add signals. For this reason, if there is a large amplitude difference between output signals VA1, VB1, VAB1 and VBB1 of the first photodetector 32 or between output signals VA2, VB2, VAB2 and VBB2 of the second photodetector 33, the correct addition result is not obtained. The foregoing amplitude control circuits 803a and 803b compensates the amplitude difference between output signals VA1, VB1, VAB1 and VBB1 of the first photodetector 32 and between output signals VA2, VB2, VAB2 and VBB2 of the second photodetector 33. In this way, if a phase difference Δ is small, only rearrangement is carried out to execute signal addition, and thereby, it is possible to obtain a correct addition result.

The switch circuit 804 has switches (four in FIG. 21) same as the number of output signals of the second photodetector 33. These switches are configured to select any of amplitude-controlled output signals VA2, VB2, VAB2 and VBB2 of the second photodetector 33 output from the amplitude control circuit 803b and to output the selected signals to the adder circuits 808.

The phase difference detector 805 detects a phase difference Δ between output signals VA1, VB1, VAB1 and VBB1 of the first photodetector 32 and output signals VA2, VB2, VAB2 and VBB2 of the second photodetector 33. Then, the detector 805 outputs a control signal to the connection change operation unit 806 if the detected phase difference Δ is less than a predetermined value (e.g., 5°).

The connection change operating unit 806 sends a switch change instruction to the switch drive circuit 807. This switch change operation is carried out in the following manner. Specifically, the amplitude-controlled output signal VA1 of the first photodetector 32 and an amplitude-controlled output signal of the second photodetector 33 having a phase approximately equal to the output signal VA1 are input to the same adder circuit 808. The amplitude-controlled output signal VB1 of the first photodetector 32 and an amplitude-controlled output signal of the second photodetector 33 having a phase approximately equal to the output signal VB1 are input to the same adder circuit 808. The amplitude-controlled output signal VAB1 of the first photodetector 32 and an amplitude-controlled output signal of the second photodetector 33 having a phase approximately equal to the output signal VAB1 are input to the same adder circuit 808. The amplitude-controlled output signal VBB1 of the first photodetector 32 and an amplitude-controlled output signal of the second photodetector 33 having a phase approximately equal to the output signal VBB1 are input to the same adder circuit 808.

The switch drive circuit 807 changes a connected between four switches according to the instructions from the connection change operating unit 806.

The adder circuit 808 adds an amplitude-controlled output signal of the first photodetector 32 and an amplitude-controlled and rearranged output signal of the second photodetector 33.

The configuration shown in FIG. 1 shows the configuration used for a relative displacement operation of FIG. 8. The adder circuit 808 of FIG. 21 corresponds to the in-phase synthesizer unit 706 of FIG. 8. According to the absolute displacement operation, output signals having the following relationship are selected from output signals of first and second photodetectors, and then, the selected signal are added and subtracted. According to the relationship, a sign of increase/decrease of an amplitude component with displacement is reverse, and the absolute value of the foregoing increase/decrease is equal, and further, the sum is constant. In the switch circuit 804, signals having the foregoing relationship are selected from output signals of first and second photodetectors, and then, input to the same adder circuit 808 and a subtractor circuit (not shown). In this way, the configuration shown in FIG. 21 is applicable to an absolute displacement operation.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A signal processing apparatus used for an optical signal output device, comprising:

a phase shift unit configured to shift phases of at least one set of first periodic signals, which are output from an optical signal output device connected to a displacement detection target and which have amplitude gradually increasing with a displacement in a predetermined direction of the displacement detection target, and second periodic signals, which are output from the optical signal output device connected to the displacement detection target and which have amplitude gradually decreasing with the displacement in the predetermined direction of the displacement detection target; and a signal processing unit configured to execute a predetermined operation with respect to the first and second periodic signals output from the phase shift unit to obtain a displacement of the displacement detection target.

2. The apparatus according to claim 1, further comprising:
a phase difference detection unit configured to detect a phase difference between at least one couple of the first and second periodic signals having a specified phase output from the optical signal output device,
the phase shift unit shifting at least one set of the first and second periodic signals by the phase difference detected by the phase difference detection unit.

3. The apparatus according to claim 1, further comprising:
an amplitude center difference detection unit configured to detect differences from predetermined values of amplitude centers of at least one couple of the first and second periodic signals having a specified phase output from the optical signal output device, or to detect a difference between the amplitude centers; and
an amplitude center difference adjustment unit configured to adjust the amplitude centers of the first and second periodic signals by the differences from the respective predetermined values of the amplitude centers detected by the amplitude center difference detection unit or to adjust the amplitude centers by the difference between the amplitude centers.

4. The apparatus according to claim 1, further comprising:
an amplitude difference detection unit configured to detect an amplitude difference between amplitude of at least one couple of the first and second periodic signals having a specified phase output from the optical signal output device; and
an amplitude control unit configured to control amplitude of the first and second periodic signals so that the amplitude difference detected by the amplitude difference detection unit is compensated.

5. The apparatus according to claim 1, wherein the signal processing unit executes at least one of the following operations as the predetermined operation, and the operations include a calculation of adding and subtracting couples of first and second periodic signals having a relationship such that signs of increase/decrease of their amplitude components with displacement are reverse, and the absolute values of the increase/decrease are equal and the sum of them is constant, output from the phase shift unit to calculate an absolute displacement of the displacement detection target, and a calculation of adding couples of first and second period signals having the same phase of the first and second periodic signals output from the phase shift unit to calculate a relative displacement of the displacement detection target.

6. The apparatus according to claim 1, wherein the optical signal output device comprises:
a scale, which is formed with first and second track patterns so that a displacement direction of the displacement detection target is set as a longitudinal direction;
a light source configured to irradiate a light beam to the scale; and
a sensor head, which includes a first photodetector detecting the light beam emitted from the light source via the first track pattern to generate the first periodic signals, and a second photodetector detecting the light beam emitted from the light source via the second track pattern to generate the second periodic signals,
the first and second track pattern, the first and second photodetectors and the light source being arranged so that detection by the first photodetector is associated with the light source and the first track pattern, and that detection by the second photodetector is associated with the light source and the second track pattern.

7. An optical displacement detection system comprising:
an optical signal output device comprising;
a scale, which is formed with first and second track patterns so that a displacement direction of the displacement detection target is set as a longitudinal direction;
a light source configured to irradiate a light beam to the scale; and
a sensor head, which includes a first photodetector detecting the light beam emitted from the light source via the first track pattern to generate first periodic signals whose amplitude gradually increase with a displacement of a predetermined direction of the displacement detection target, and a second photodetector detecting the light beam emitted from the light source via the second track pattern to generate second periodic signals whose amplitude gradually decrease with the displacement of the predetermined direction of the displacement detection target,
the first and second track patterns, the first and second photodetectors and the light source being arranged so that detection by the first photodetector is associated with the light source and the first track pattern, and that detection by the second photodetector is associated with the light source and the second track pattern,
a signal processing apparatus comprising:
a phase shift unit configured to shift phases of at least one set of the first and second periodic signals; and
a signal processing unit configured to execute a predetermined operation with respect to the first and second periodic signals output from the phase shift unit to obtain a displacement of the displacement detection target.

8. The system according to claim 7, wherein the signal processing apparatus further comprises a phase difference detection unit configured to detect a phase difference between at least one couple of the first and second periodic signals having a specified phase output from the optical signal output device, and
the phase shift unit shifts at least one set of the first and second periodic signals by the phase difference detected by the phase difference detection unit.

9. The system according to claim 7, wherein the signal processing apparatus further comprises:
an amplitude center difference detection unit configured to detect differences from predetermined values of amplitude centers of at least one couple of the first and second periodic signals having a specified phase output from the optical signal output device, or to detect a difference between the amplitude centers; and
an amplitude center difference adjustment unit configured to adjust the amplitude centers of the first and second periodic signals by the differences from the respective predetermined value of the amplitude centers detected by the amplitude center difference detection unit or to adjust the amplitude centers by the difference between the amplitude centers.

10. The system according to claim 7, wherein the signal processing apparatus further comprises:
an amplitude difference detection unit configured to detect an amplitude difference between amplitude of at least one couple of the first and second periodic signals having a specified phase output from the optical signal output device; and an amplitude control unit configured to control amplitude of the first and second periodic signals so that the amplitude difference detected by the amplitude difference detection unit is compensated.

11. The system according to claim 7, wherein the signal processing unit executes at least one of the following operations as the predetermined operation, and the operations include a calculation of adding and subtracting couples of first and second periodic signals having a relationship such that a sign of increase/decrease of their amplitude components with displacement are reverse, and the absolute values of the increase/decrease are equal and the sum of them is constant, output from the phase shift unit to calculate an absolute displacement of the displacement detection target, and a calculation of adding couples of first and second period signals having the same phase output from the phase shift unit to calculate a relative displacement of the displacement detection target.

* * * * *